(12) United States Patent
Michisaka et al.

(10) Patent No.: US 7,134,706 B2
(45) Date of Patent: Nov. 14, 2006

(54) UNLOCKING MEMBER ARRANGING STRUCTURE FOR VEHICLES

(75) Inventors: Susumu Michisaka, Saitama (JP); Nobuo Yamaguchi, Saitama (JP); Kengo Yano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 87 days.

(21) Appl. No.: 11/037,072

(22) Filed: Jan. 19, 2005

(65) Prior Publication Data

US 2005/0200156 A1 Sep. 15, 2005

(30) Foreign Application Priority Data

Jan. 20, 2004 (JP) .............................. 2004-012505

(51) Int. Cl.
*B62D 25/00* (2006.01)

(52) U.S. Cl. .................................. 296/97.22; 180/219

(58) Field of Classification Search ............. 296/97.22, 296/37.1; 280/834
See application file for complete search history.

(56) References Cited

U.S. PATENT DOCUMENTS

| | | | | | |
|---|---|---|---|---|---|
| 4,413,700 | A | * | 11/1983 | Shiratsuchi ................. | 180/219 |
| 4,830,134 | A | * | 5/1989 | Hashimoto ................. | 280/834 |
| 5,040,632 | A | * | 8/1991 | Fujii et al. ................ | 296/37.15 |
| 5,094,315 | A | * | 3/1992 | Taki et al. ................ | 296/97.22 |
| 5,291,067 | A | | 3/1994 | Nakajima et al. | |
| 5,433,286 | A | * | 7/1995 | Kumamaru et al. ........ | 180/219 |
| 6,231,106 | B1 | * | 5/2001 | Nagasaka ................. | 296/97.22 |
| 6,644,693 | B1 | * | 11/2003 | Michisaka et al. .......... | 180/219 |
| 6,814,477 | B1 | * | 11/2004 | Yamaguchi et al. ........ | 362/497 |
| 7,004,276 | B1 | * | 2/2006 | Iizuka et al. ............... | 296/37.1 |
| 2002/0189877 | A1 | * | 12/2002 | Yagisawa et al. ........... | 180/219 |
| 2005/0082100 | A1 | * | 4/2005 | Sakaki et al. ............... | 180/219 |
| 2005/0083208 | A1 | * | 4/2005 | Konno et al. ............... | 180/167 |
| 2005/0098596 | A1 | * | 5/2005 | Yano et al. ................. | 224/413 |
| 2005/0099264 | A1 | * | 5/2005 | Konno et al. ............... | 180/287 |
| 2005/0103069 | A1 | * | 5/2005 | Konno et al. ................. | 70/282 |
| 2005/0155804 | A1 | * | 7/2005 | Kamemizu et al. ......... | 180/219 |

FOREIGN PATENT DOCUMENTS

| | | | |
|---|---|---|---|
| FR | 2802889 | A1 | 6/2001 |
| GB | 0800988 | A1 | 10/1997 |
| GB | 0856462 | A2 | 5/1998 |
| GB | 0825101 | A3 | 12/1998 |
| JP | 11-227658 | A | 8/1999 |
| JP | 180565 | A3 | 6/2001 |

* cited by examiner

*Primary Examiner*—Kiran B. Patel
(74) *Attorney, Agent, or Firm*—Birch, Stewart, Kolasch & Birch, LLP

(57) ABSTRACT

In a vehicle wherein a functional part arranged in a body cover is supported by a body frame and a lid which makes it possible to lock a closed state covering the functional part can be openably fitted to the body cover in a position matching the functional part. Thus, the risk of undesirable tampering with the unlocking member is to be minimized and the risk for the unlocking member to be influenced by external disturbance such as unfavorable weather is to be avoided as far as possible. A cover member in which a lid is arranged in a secluded position is openably disposed on a body cover, and an unlocking member for releasing the lid from the locked state is disposed on the body cover so as to be covered by a cover member in a closed state.

20 Claims, 23 Drawing Sheets

UNLOCKING MEMBER ARRANGING STRUCTURE FOR VEHICLES

CROSS-REFERENCE TO RELATED APPLICATIONS

The present application is related to Japanese Patent Application No. 2004-012505 filed on Jan. 20, 2004 the entire contents of which are hereby incorporated by reference.

BACKGROUND OF THE INVENTION

1. Field of the Invention

The present invention relates to a vehicle in which a functional part arranged in a body cover is supported by a body frame and to which a lid for enabling a closed state for covering and locking the functional part is openably fitted to the body cover in a position matching the functional part. More particularly, to the improvement of the arranging structure for an unlocking member for releasing the lid from the locked state.

2. Description of Background Art

A configuration in which fuel tank, as a functional part, is disclosed in JP-A No. 227658/1999 wherein the fuel tank is arranged on the low floor part of a scooter type vehicle with a lid for covering the fuel refill cap. The fuel tank is fitted to the body cover with a keyhole for inserting a key to unlock a locking mechanism for locking the lid in a closed state that is arranged in the vicinity of the lid in a position overlooking the outer face of the body cover.

However, if part of an unlocking member provided with a keyhole is arranged with part of the unlocking member overlooking the outer face of the body cover as in the conventional configuration mentioned above, it will be subject to undesirable tampering. Moreover, it is required to configure the unlocking member to have sufficient durability to stand even under the influence of external disturbances such as unfavorable weather.

SUMMARY AND OBJECTS OF THE INVENTION

An object of the present invention, attempted in view of these circumstances, is to provide an unlocking member arranging structure for vehicles which can prevent the unlocking member from releasing the lid from its locked closed state from being undesirably tampered with and minimize the risk for the unlocking member to be influenced by external disturbances such as an unfavorable weather.

In order to achieve the objected stated above, the present invention provides a scooter-type vehicle wherein a functional part arranged in a body cover is supported by a body frame and a lid which makes it possible to lock a closed state covering the functional part that can be openably fitted to the body cover in a position matching the functional part. A cover member is arranged in a position away from the lid that is openably fitted to the body cover. An unlocking member is provided for releasing the lid from a locked state and is so arranged on the body cover so as to be covered by the cover member in a closed state.

The present invention provides the cover member and the unlocking member that are arranged onto an inner cover which covers from behind a head pipe provided on the body frame at its front end and constitutes part of the body cover.

The present invention includes the cover member and the unlocking member that are arranged onto an inner cover which covers from behind a head pipe provided on the body frame at its front end and constitutes part of the body cover.

The present invention includes the storage compartment that is disposed in the inner cover to be slidable in a back-and-forth direction of the body between a fully closed position of being accommodated in the inner cover and a fully open position of projecting from the inner cover and is offset from the storage compartment as viewed from behind in the back-and-forth direction of the body. The unlocking member is disposed on the inner cover in a position of at least partly overlapping the head pipe with the cover member being fitted to the storage compartment so as to cover the unlocking member in a state in which the storage compartment is in the fully closed position.

The present invention is provided with a compartment locking mechanism to lock the storage compartment in its fully closed position.

The present invention includes left and right front storage sections that are disposed in the inner cover along the direction of the body width with a space between them, and with the unlocking member being arranged between the left and right front storage sections.

The present invention includes the unlocking member that is arranged in a position offset from the body center line toward one side in the right-and-left direction.

Further, the present invention includes a functional part is a fuel tank arranged in the vicinity of a step floor which the body cover is provided with. The lid is fitted to the body cover so as to cover the fuel refill cap of the fuel tank.

According to the present invention, as long as the cover member is in a closed state, the unlocking member will not be exposed. Therefore it is possible to prevent the unlocking member from being undesirably tampered with and to minimize the risk for the unlocking member to be influenced by external disturbances such as an unfavorable weather.

According to the present invention, it is possible to facilitate the manipulation of the unlocking member by arranging the unlocking member in a position in a forward position close to the rider.

According to the present invention, it is made possible to reduce the number of components by making a dedicated member to cover the unlocking member unnecessary.

According to the present invention, it is possible to arrange the unlocking member with greater space efficiency while securing an adequate capacity for the storage compartment by making it a drawer type.

According to the present invention it is unnecessary to provide a dedicated locking mechanism for opening the lid because, in order to open the lid, it is necessary to release the storage compartment from the locked state in its fully closed position.

According to the present invention, it is possible to arrange the unlocking member with greater space efficiency by arranging the unlocking member in the space created between the left and right front storage sections.

According to the present invention, it is possible, by arranging the unlocking member in a position close to either hand of the rider on the riding seat, to facilitate its manipulation.

According to the present invention, greater effectiveness is achieved because the lid is arranged so as to cover the fuel refill cap, which is frequently used.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A mode for carrying out the present invention will be described below with reference to one embodiment of the invention illustrated in the accompanying drawings.

Figure 1:
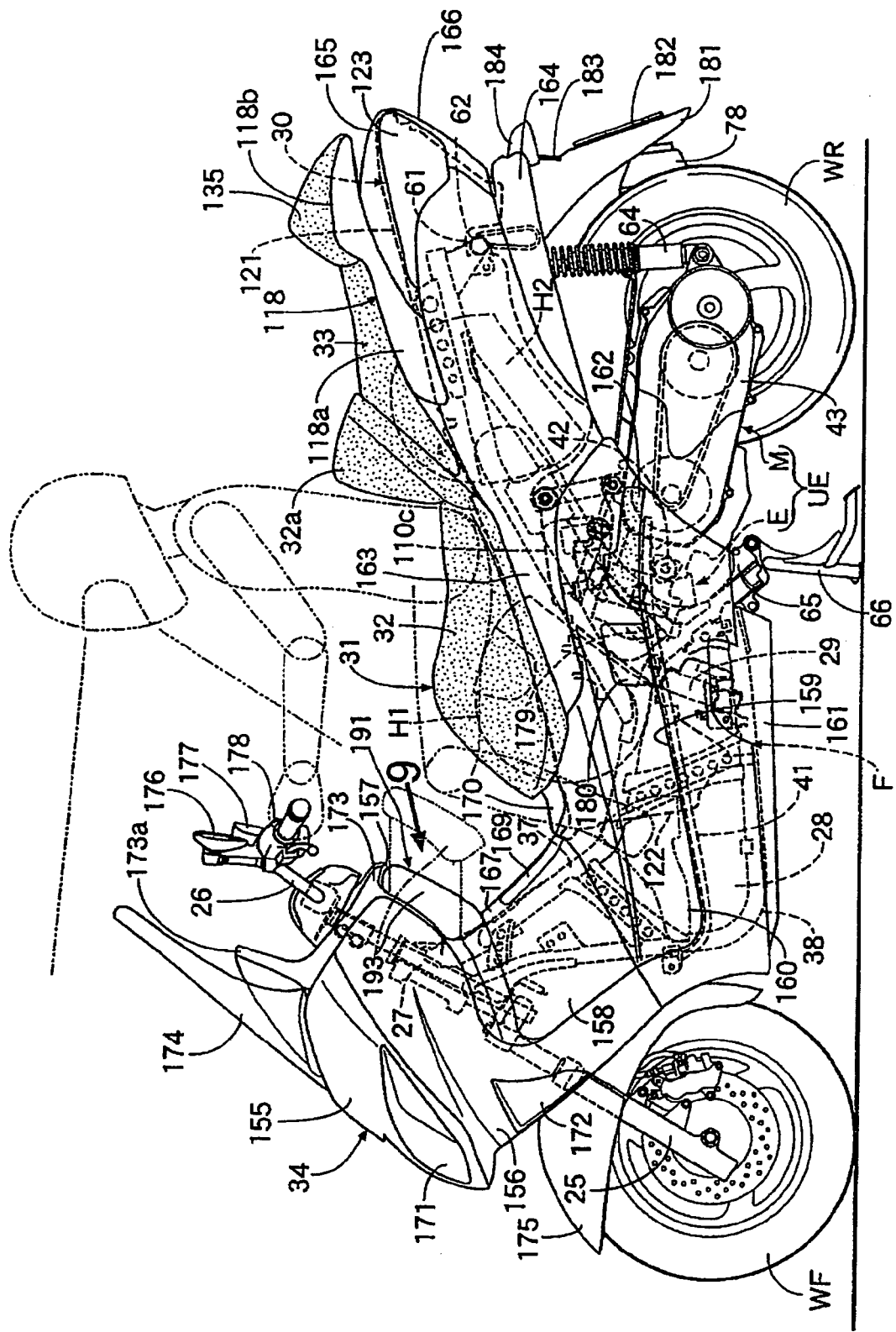
FIG. 1 is a left profile of a scooter-type motorcycle.

As illustrated in FIG. 1, the body frame F of a scooter-type motorcycle is provided at its front end with a front fork 25 bearing the shaft of the front wheel WF and a head pipe 27 steerably bearing a steering handlebar 26 linked to the front fork 25. A unit swing engine UE includes a rear end wherein a rear wheel WR is supported to be movable up and down by the central part, in the back-and-forth direction, of the body frame F. The body frame F is mounted farther forward than the unit swing engine UE with a fuel tank 28, which is a functional part formed to be long in the vertical direction in a profile view. A radiator 29 is arranged farther rearwardly than the fuel tank 28. In the rear part of the body frame F, there is arranged a seating 31 composed of a rider's seat 32 and a pillion 33 in tandem. Further, a synthetic resin-made body cover 34 covers the body frame F, the front part of the unit swing engine UE, with the fuel tank 28 and the radiator 29 being fitted to the body frame F.

Figure 2:
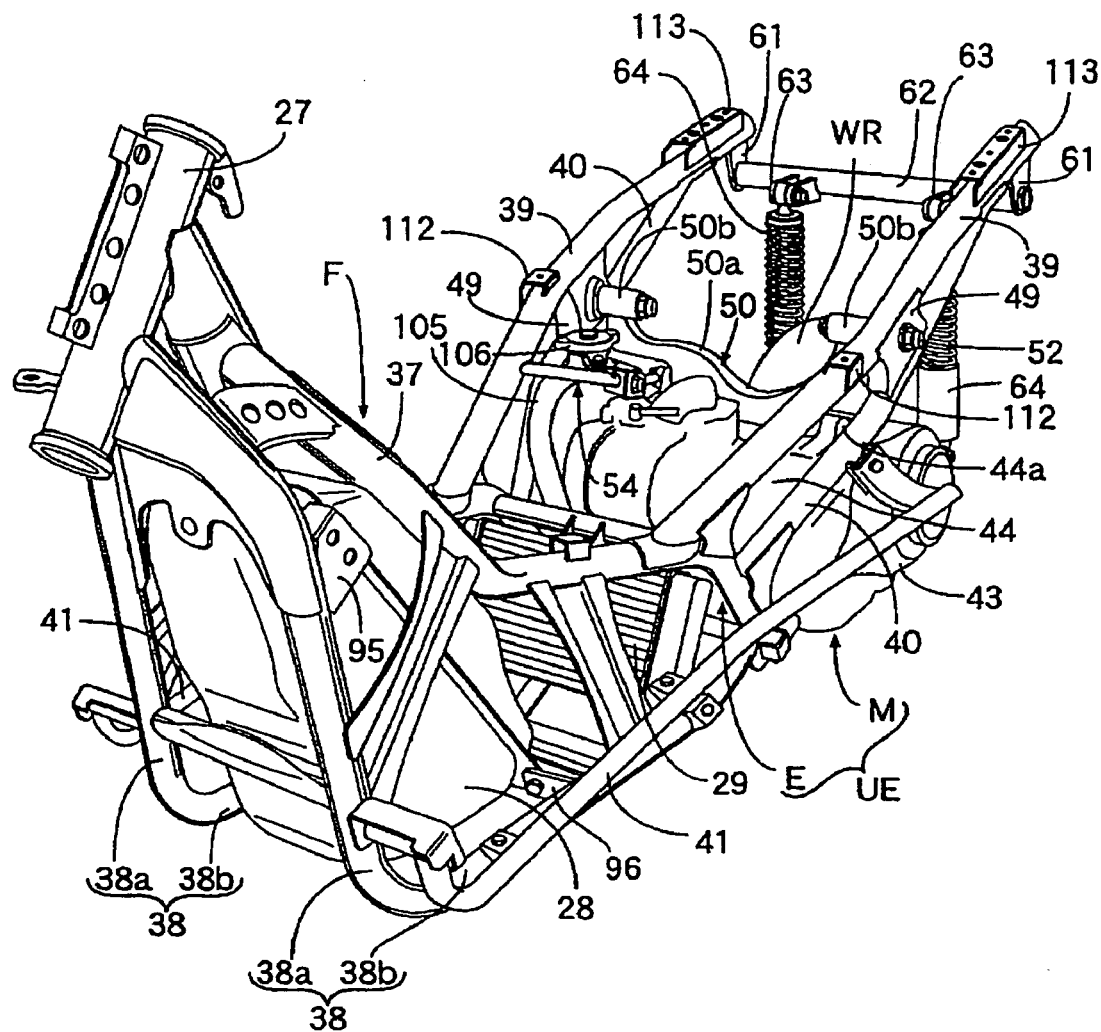
FIG. 2 is a perspective view of a body frame in a state of being fitted with a fuel tank and a radiator.
Figure 3:
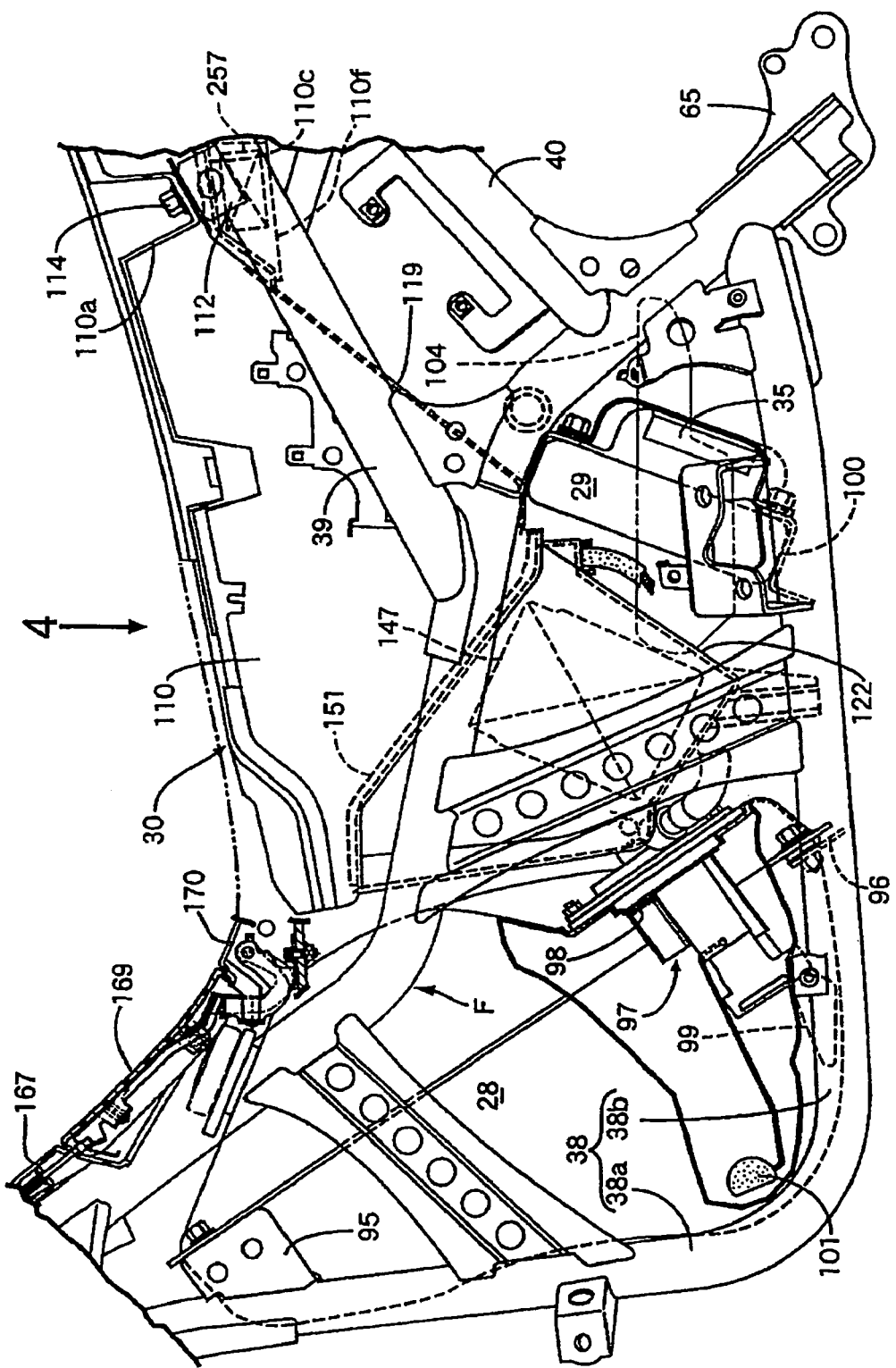
FIG. 3 is a left profile of the scooter-type motorcycle in the back-and-forth direction in a state in which the riding seat and body cover are removed.

With reference to FIG. 2 and FIG. 3 together, the body frame F is provided with the head pipe 27, a pair of left and right upper down frames 37 . . . linked to the head pipe 27 and extending downwardly towards the back, a pair of left and right lower down frames 38 and 38 composed by integrally linking their horizontal portions 38b . . . to the rear ends of their inclined portions 38a . . . linked to the head pipe 27 in a lower position than those upper down frames 37 . . . and extending downwardly towards the back and welding their rear ends to the rear end parts of the upper down frames 37 . . . A pair of left and right seat rails 39 and 39 extend rearwardly and upwardly from the middle parts of the upper down frames 37 . . . with a pair of left and right rear frames 40 and 40 linking the rear ends of the upper down frames 37 . . . and the rear ends of the seat rails 39. . . . A pair of left and right support frames 41 and 41 are arranged along the outer side of the upper down frames 37 . . . , the lower down frames 38 . . . and the rear frames 40. . . .

The two support frames 41 . . . provide support from underneath step floors 15 . . . and are provided on the left and right of the body cover 34 with the front ends of the two support frames 41 . . . being coupled to the lower parts of the inclined portions 38a . . . in lower down frames 38. . . . The rear ends of the two support frames 41 . . . are coupled to the middle parts of the rear frames 40. . . .

Figure 4:
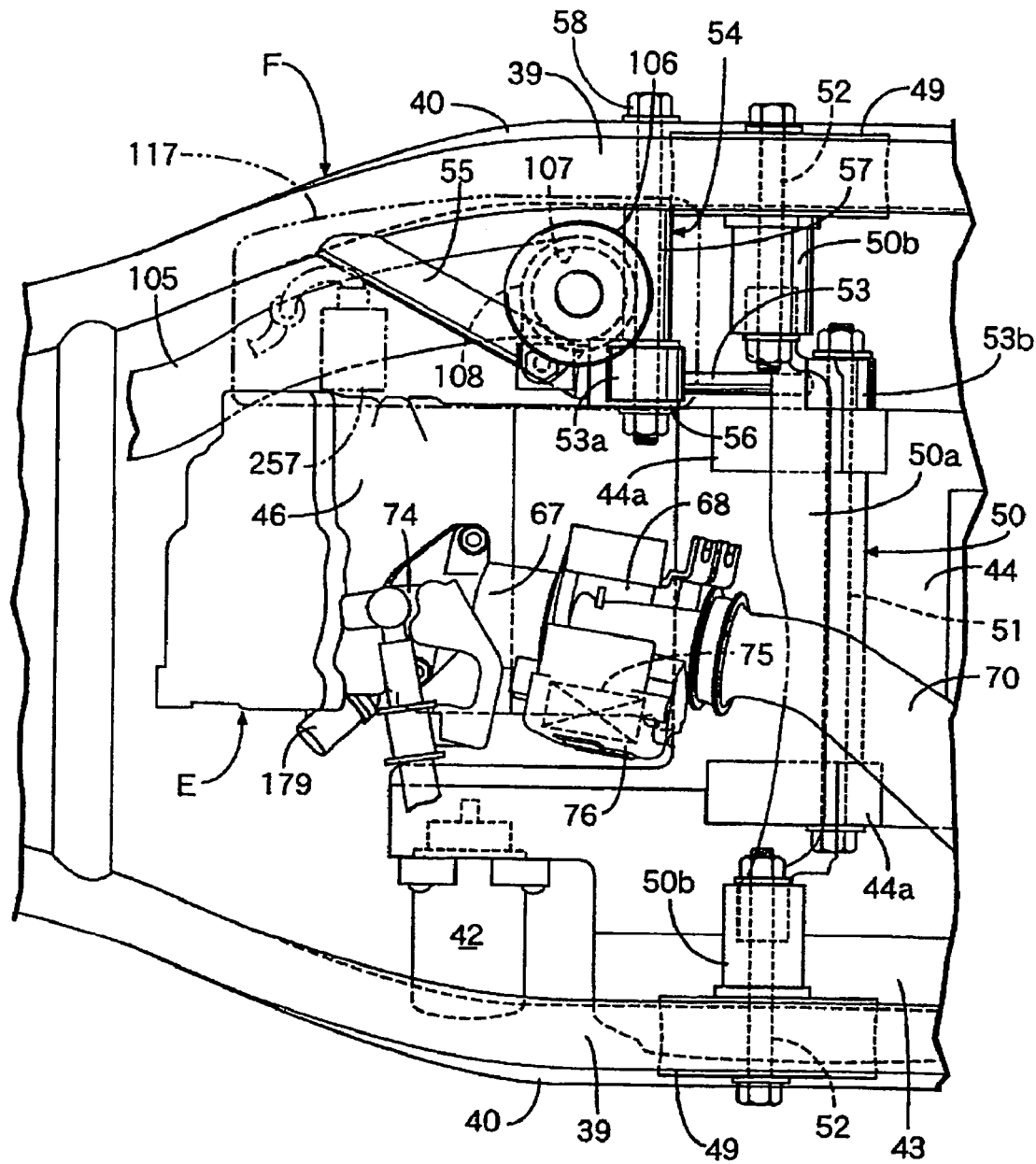
FIG. 4 is an arrow 4 view of FIG. 3 in a state in which a storage box is removed.
Figure 5:
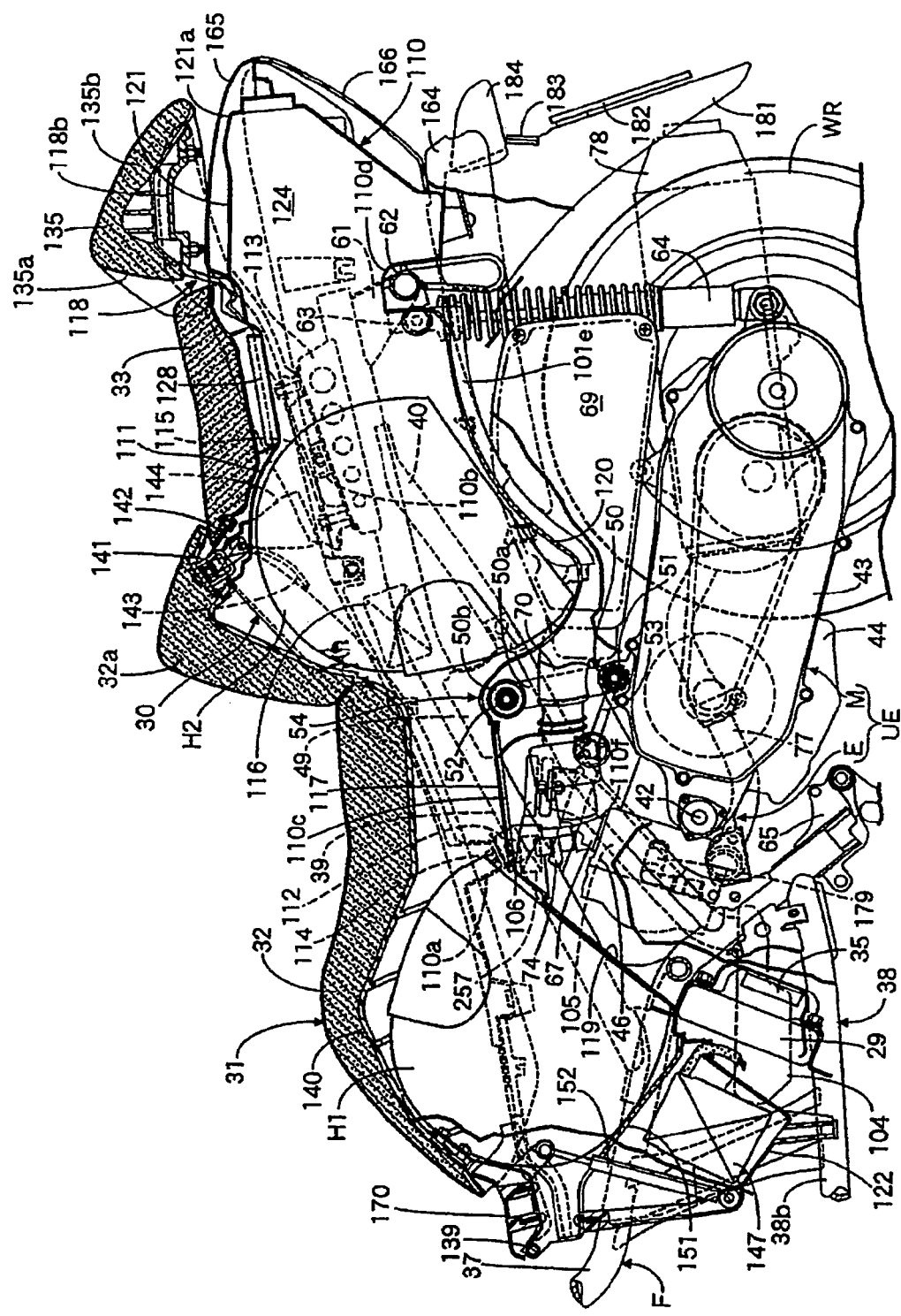
FIG. 5 is an enlarged longitudinal sectional profile of the rear part of the scooter-type motorcycle.

Referring to FIGS. 4 and 5 together, the unit swing engine UE is configured of an air-cooled engine E whose cylinder axis is horizontal and a belt-type continuously variable transmission M for continuously changing the output of the engine E in speed with a transmission belt and a pulley and transmitting it to the rear wheel WR. The continuously variable transmission M continuously varies the gear ratio by driving a movable pulley on the crankshaft side in response to the operation of an electric motor 42 for speed change use.

The transmission case 43 of the continuously variable transmission M is so linked to the left side of the crankcase 44 in the engine E as to project leftward from the engine E, and extends to the left side of the rear wheel WR. The right side of the crankcase 44 is coupled to the front end of a swing arm, not shown, and the rear wheel WR is supported between the rear end of the transmission case 43 and that of the swing arm.

Brackets 49 and 49 are disposed between the middle parts of the seat rails 39 . . . and the rear frames 40 . . . in the body frame F, and a pair of supporting projections 44a and 44a project from the upper face of the crankcase 44 in the engine E. A link 50 is provided with a link cylindrical portion 50a extending in the direction of the body width and with cylindrical supporting cylinders 50b and 50b at both ends of the link cylindrical portion 50a. The two supporting protrusion 44a and 44a and the link cylindrical portion 50a are linked by a linking shaft 51. The supporting cylinders 50b and 50b at the two ends of the link 50 are rotatably supported by the brackets 49 and 49 via spindles 52 and 52 which are parallel to the linking shaft 51. Thus, the unit swing engine UE is supported by the body frame F to be oscillatable around the shafts of the two spindles 52 and 52.

In addition, a tension rod 53 is disposed between the engine E and the body frame F with ring-shaped linking portions 53a and 53b being provided at the two ends of this tension rod 53. And the linking portion 53a at one end of the tension rod 53 is rotatably fitted to a fitting portion 54 provided on the righthand seat rail 39 and the rear frames 40 of the body frame F, and the linking portion 53b at the other end of the tension rod 53 is rotatably linked to the righthand end of the linking shaft 51 which links the crankcase 44 to the link 50.

The fitting portion 54 is provided with a supporting cylinder 55 hanging rearwardly and extending obliquely rearwardly from the front part of the righthand seat rail 39 with a bracket 56 in a substantially U shape open rearwardly and fastened to the rear end of the supporting cylinder 55. A linking cylinder 57 is provided for linking the righthand rear frame 40 and the bracket 56 to each other, wherein the linking portion 53a at one end of the tension rod 53 is rotatably supported by the fitting portion 54 with a bolt 58 inserted into the bracket 56 and the linking cylinder 57 and fixed to the body frame F.

At the rear ends of the two seat rails 39 . . . in the body frame F, supporting plates 61 and 61 that hanging downwardly are fastened with the upper ends of rear shock absorbers 64 and 64 being linked to a pair of brackets 63 and 63 provided on a supporting pipe 62 spanning between the two supporting plates 61 and 61. The low ends of the two rear shock absorbers 64 and 64 are linked to the rear end of the transmission case 43 and a swing arm.

Brackets 65 . . . are fitted to the rear ends, i.e. the lower ends, of the two upper down frames 37 . . . , and a main stand 66 is rotatably supported by the two brackets 65. . . . When the main stand 66 is erected, the scooter-type motorcycle can be caused to sustain itself by keeping the rear wheel WR off the ground as shown in FIG. 1 and, when the motorcycle is operated, the main stand 66 can be stowed to bring the rear wheel WR into contact with the ground.

To the upper face of a cylinder head 46 in the engine E, the downstream end of a throttle body 68 is connected via an intake pipe 67 curved rearwardly from the cylinder head 46. The upstream end of the throttle body 68 is connected to an air cleaner 69 arranged above the continuously variable transmission in the unit swing engine UE via a connecting pipe 70 passing above a link cylindrical portion 50a in the link 50.

A fuel injection valve 74 is fitted to the intake pipe 67. A control box 76, that accommodates a controller 75 for controlling the ignition timing of the engine E and the fuel injection quantity of the fuel injection valve 74, is fitted to the throttle body 68.

An exhaust pipe 77 is connected to the lower face of the cylinder head 46, and the exhaust pipe 77 is connected to an exhaust muffler 78 arranged to the right of the swing arm.

Fuel is fed from the fuel tank 28 to the fuel injection valve 74 which injects fuel towards the engine E. The fuel tank 28 is surrounded by the pair of left and right upper down frames 37 . . . and the pair of left and right lower down frames 38 of the body frame F. At the same time, the fuel tank 28 is arranged in a space immediately behind the front wheel WF. Moreover, the fuel tank 28 is formed so as to extend vertically from behind the lower part of the head pipe 27 to underneath the two lower down frames 38. . . .

Fitting plates 95 . . . for fastening the upper part of the fuel tank 28 are welded onto the inclined portions 38a . . . of the two lower down frames 38 . . . In addition, fitting plates 96 . . . for fastening the lower part of the fuel tank 28 are welded onto the horizontal portions 38b . . . of the two lower down frames 38. . . .

A pump unit 97 is accommodated in the lower part of the fuel tank 28 with the pump unit 97 being inserted into the fuel tank 28 through a fitting hole 98 formed in the rear face of the lower part of the fuel tank 28 and fitted to the fuel tank 28 from the rear side of the fuel tank 28.

In addition, the pump unit 97 is fitted with its rotational axis being inclined forward. A fuel filter 99 is appended to the pump unit 97 for sucking fuel in the fuel tank 28. The fuel filter 99 is arranged in the lowermost part of the fuel tank 28. A float 101 moves up and down according to the quantity of fuel in the fuel tank 28 and extends out of the pump unit 97. The remaining quantity of fuel detected by the float 101 is transmitted to the controller 75 in the control box 76 fitted to the throttle body 68.

The radiator 29 includes a radiator fan 35 arranged in a position with a spacing behind the fuel tank 28. The radiator 29 is supported by a supporting frame 100 disposed between the rear parts of the horizontal portions 38b . . . in the two lower down frames 38 . . . of the body frame F and the rear parts of the two upper down frames 37 . . . in the body frame F.

The lower end of a hose 105 extends upwardly and is connected to a reservoir tank 104 that is continuous from the radiator 29. The upper end of the hose 105 is connected to a water inlet forming member 108 constituting a water inlet 107 which can be opened and closed with a cap 106.

In addition, the water inlet forming member 108 is supported by the fitting portion 54 of the tension rod 53, disposed between the body frame F and the unit swing engine UE oscillatably supported by the body frame F, toward the body frame F. Thus, the water inlet forming member 108 is supported by the supporting cylinder 55 hanging rearwardly and extending obliquely rearwardly from the front part of the righthand seat rail 39 and constituting part of the fitting portion 54.

Figure 6:
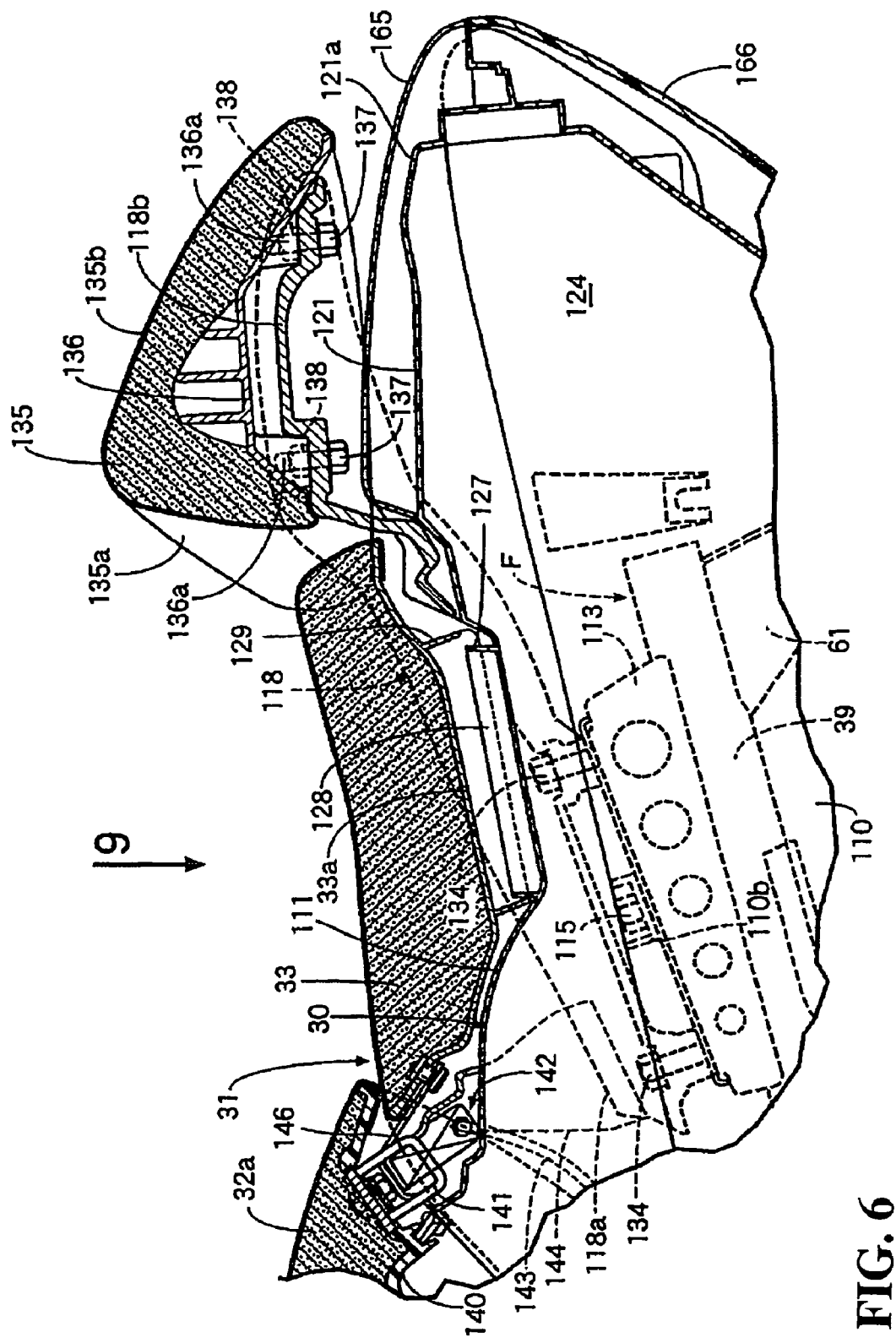
FIG. 6 is a longitudinal section of the vicinity of the rear part of the storage box.

With reference to FIG. 6 together, a storage box or part 30 is arranged underneath the seating 31 behind the upper down frames 37 . . . in the body frame F and between the two seat rails 39 . . . and the two rear frames 40 . . . The storage box 30 consists of a box body 110 with an upper end that is open and an upper face cover 111 coupled to the box body 110 so as to cover the box body 110. The storage box 30 is arranged so as to extend from underneath the front end of the seating 31 to the vicinity of the upper part of the rear shock absorbers 64. . . .

In order to have the storage box 30 supported by the body frame F, front supporting members 112 . . . are welded onto the middle parts of the pair of seat rails 39 . . . in the body frame F. In addition, rear supporting members 113 . . . , are long in the back-and-forth direction, and are welded onto the rear parts of the two seat rails 39. . . . Further, front fitting parts 110a . . . to be mounted on the front supporting members 112 . . . and the rear fitting parts 110b . . . to be mounted on the middle parts in the lengthwise direction of the rear supporting members 113 . . . are provided above the two sides of the box body 110 in the storage box 30. The front fitting parts 110a . . . are fastened with bolts 114 . . . to the front supporting members 112 . . . In addition, the rear fitting parts 110b . . . are fitted with bolts 115 . . . to the rear supporting members 113. . . .

A front helmet storage part 119 is arranged underneath the rider's seat 32 to enable a helmet H1 to be stored. A rear helmet storage part 120 is arranged underneath the pillion 33 to enable a helmet H2 to be stored. A substantially flat shallow bottom part 110c is arranged between the front helmet storage part 119 and the rear helmet storage part 120 and is formed in the bottom wall of the storage box 30, i.e. the bottom wall of the box body 110. The front and rear helmet storage parts 119 and 120 are formed in a downward bulging shape. In addition, the front edge of the upper face cover 111 in the storage box 30 is formed in an arc shape bulging rearwardly as viewed from above to enable the helmet 2 to be stored in the rear helmet storage part 120. Further, an illuminating device 116, for illuminating the inside of the storage box 30, is fitted to an inner side face of the box body 110 in the part matching the front part of the upper face cover 111.

Underneath the shallow bottom part 110c in the storage box 30, the throttle body 68 and the fuel injection valve 74 are arranged with their upper end positions being substantially equal. The reservoir tank 104 and the water inlet 107 are also arranged. In addition, a first maintenance lid 117 is openably fitted to the shallow bottom part 110c above the water inlet 107.

Behind the storage box 30, the supporting pipe 62, which is the upper fitting portion of the rear shock absorber 64 . . . to the body frame F, and a rear bulging part 121 bulging farther behind the rear end of the pillion 33 are provided. A narrow width portion 121a is disposed in the middle of the rear part of the rear bulging part 121 with a tail lamp units 123 . . . arranged on the two sides of the narrow width portion 121a.

The lower portion of the rear bulging part 121 is arranged lower than the supporting pipe 62, which is the fitting portion for the rear shock absorber 64 . . . to the body frame F. A rising part 110d matching the fitting portion to the body frame F above the rear shock absorber 64 . . . is formed so as to partially raise the bottom wall of the storage box 30, namely the bottom wall of the box body 110, and a glove compartment 124, with the rising part 110d intervening therebetween. The rear helmet storage part 120, is formed within the rear bulging part 121.

The pillion 33 of the seating 31 is formed so as to cover the front side of the upper face cover 111 on the storage box 30. The pillion 33 is detachably fitted to the upper face cover 111. An endlessly continuous rectangular first rib 127 projects from the upper face of the upper face cover 111. A storage space 128, surrounded by this first rib 127, that is available dependent on the attachment or detachment of the pillion 33, is formed on the upper face of the upper face cover 111. From the bottom plate 33a of this pillion 33, a second rib 129, endlessly and continuously surrounds the first rib 127 and hangs down. A labyrinth structure is formed in which the storage space 128 is surrounded by the first and second ribs 127 and 129.

A grab rail 118 is a metallic item integrally having grabbing portions 118a . . . arranged on the two sides of the pillion 33 and extending in the back-and-forth direction with a linking portion 118b. The front parts of the two grabbing portions 118a are fastened to the rear supporting members 113 . . . welded onto the rear parts of the seat rails 39 . . . in the body frame F with bolts 134 . . . in two positions where the fastening portion to the rear supporting members 113 . . . are held between front and rear.

The linking portion 118b is arranged in a position with a space upward from the upper part of the rear bulging part 121 of the storage box 30 and integrally linked to the rear ends of the two grabbing portions 118a . . . with their height substantially equalized to the upper face of the pillion 33. A back rest 135, for holding the passenger riding the pillion 33 from behind the waist is detachably fitted to the linking portion 118b.

Thus, a plurality of legs 136a . . . , in contact with the linking portion 118b of the grab rail 118, are integrally disposed on and project from the bottom plate 136 of the back rest 135. Nuts 138 . . . are embedded into the legs 136a . . . , and the back rest 135 is detachably fitted to the upper face of the rear part of the grab rail 118, namely the upper face of the linking portion 118b, by fastening bolts 137 . . . inserted from underneath into the linking portion 118b of the grab rail 118 by screwing into the nuts 138. . . .

Moreover, the back rest 135 has on its top a forward inclining face 135a falling forwardly as viewed sideways and a rearwardly inclining face 135b falling rearwardly. The back rest 135 is formed so that its width gradually narrows rearwardly as viewed from above with the grab rail 118 and the back rest 135 overlapping each other almost wholly as viewed from above.

The rider's seat 32 of the seating 31 has in its rear part integrally a back rest part 32a rising so as to hold the rider seated on the rider's seat 32 from behind the waist, and is arranged on the storage box 30 so as to cover the front opening of the storage box 30 not covered by the upper face cover 111 from above. The front end of the rider's seat 32 is linked to the front end of the storage box 30 via a hinge pin 139. Thus, the front end of the rider's seat 32 is supported by the storage box 30 to be vertically openable.

A substantially U-shaped striker 141 is fitted to the rear part of the bottom plate 140 of the rider's seat 32 in a position matching the central part in the widthwise direction of the pillion 33. Between the front parts of the rider's seat 32 and of the pillion 33 of the upper face cover 111 in the storage box 30, there is arranged a seat locking mechanism 142 capable of changing over between a seat locked state in which the rider's seat 32 is held in a closed state by grabbing the striker 141 and a seat unlocked state in which the opening/closing of the rider's seat 32 is made possible by releasing the striker 141 from grabbing. The seat locking mechanism 142 is configured so as to be engaged with the striker 141 to enter into the seat locked state when the rider's seat 32 in a state of being opened upwardly is descended to close the opening of the storage box 30 and to change over from the seat unlocked state to the seat locked state by the pulling of a transmission cable 143.

The seat locking mechanism 142 is disposed on a metallic bridging plate 144 arranged between the front ends of the two grabbing portions 118a . . . in the grab rail 118, and this bridging plate 144 is formed so as to enter between the upper face cover 111 and the pillion 33 from the two grabbing portions 118a . . . and to be along the front upper face of the upper face cover 111.

Figure 8:
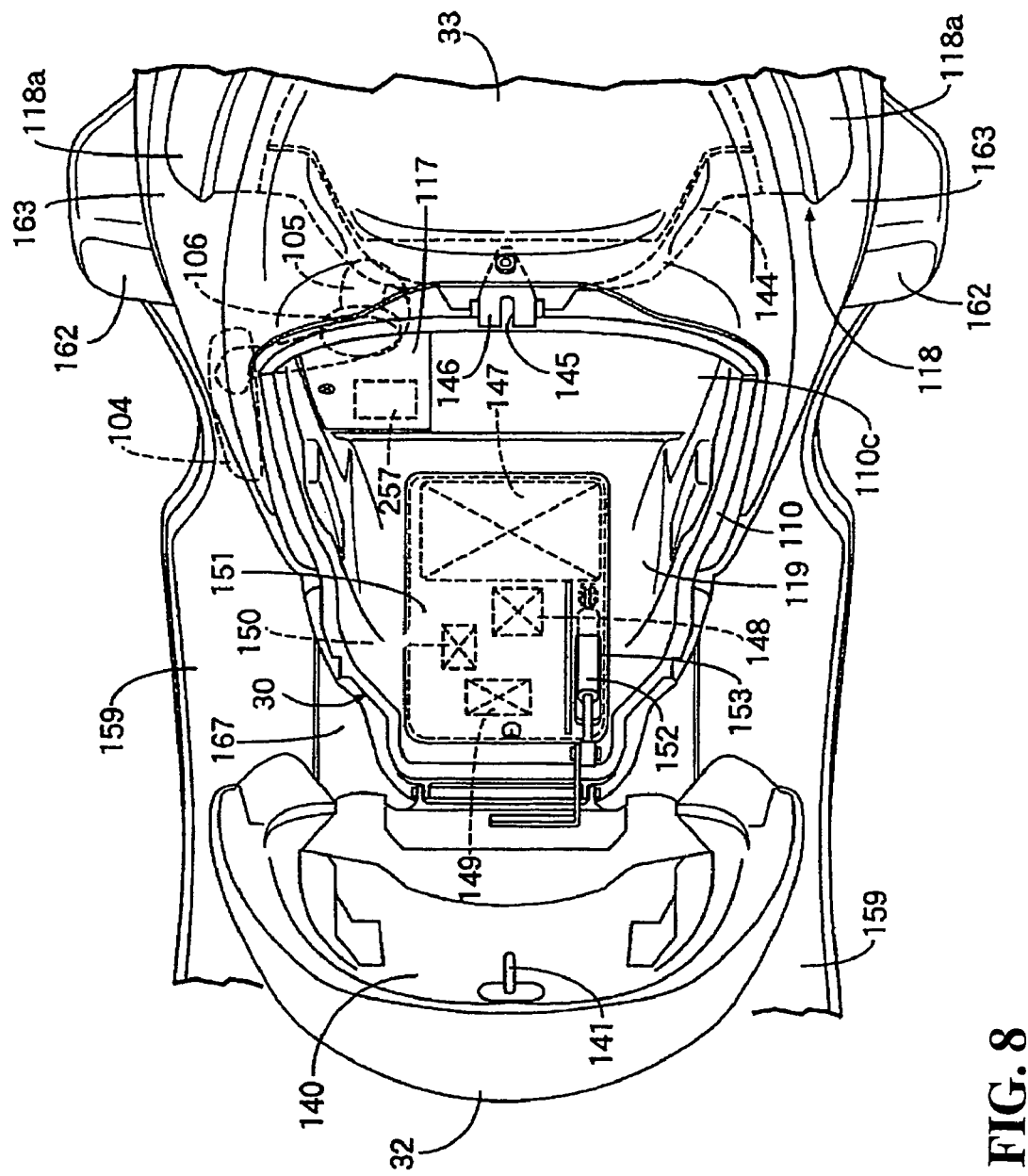
FIG. 8 is an arrow 8 view of FIG. 7.
Figure 9:
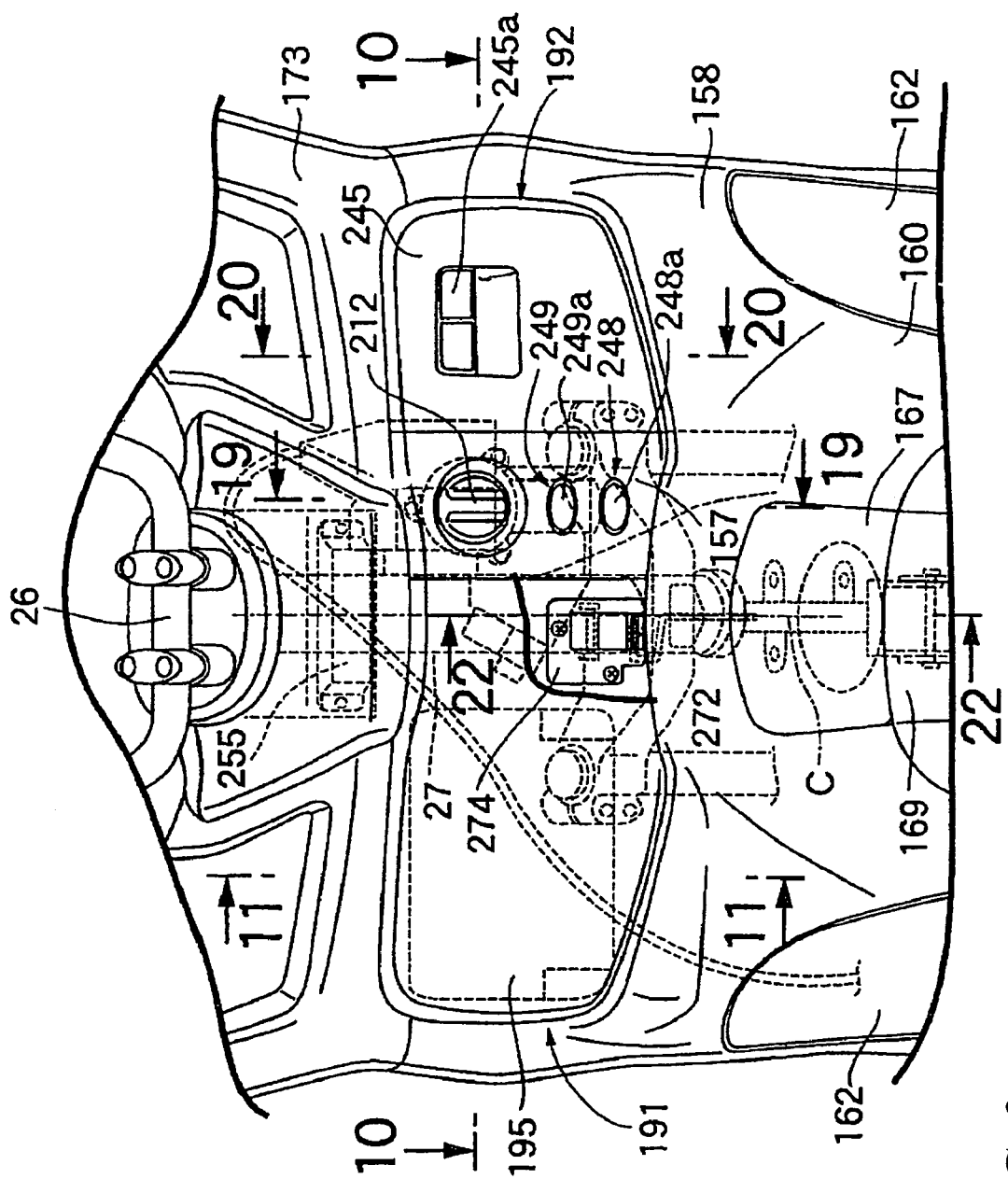
FIG. 9 is an enlarged arrow 9 view of FIG. 1.
Figure 10:
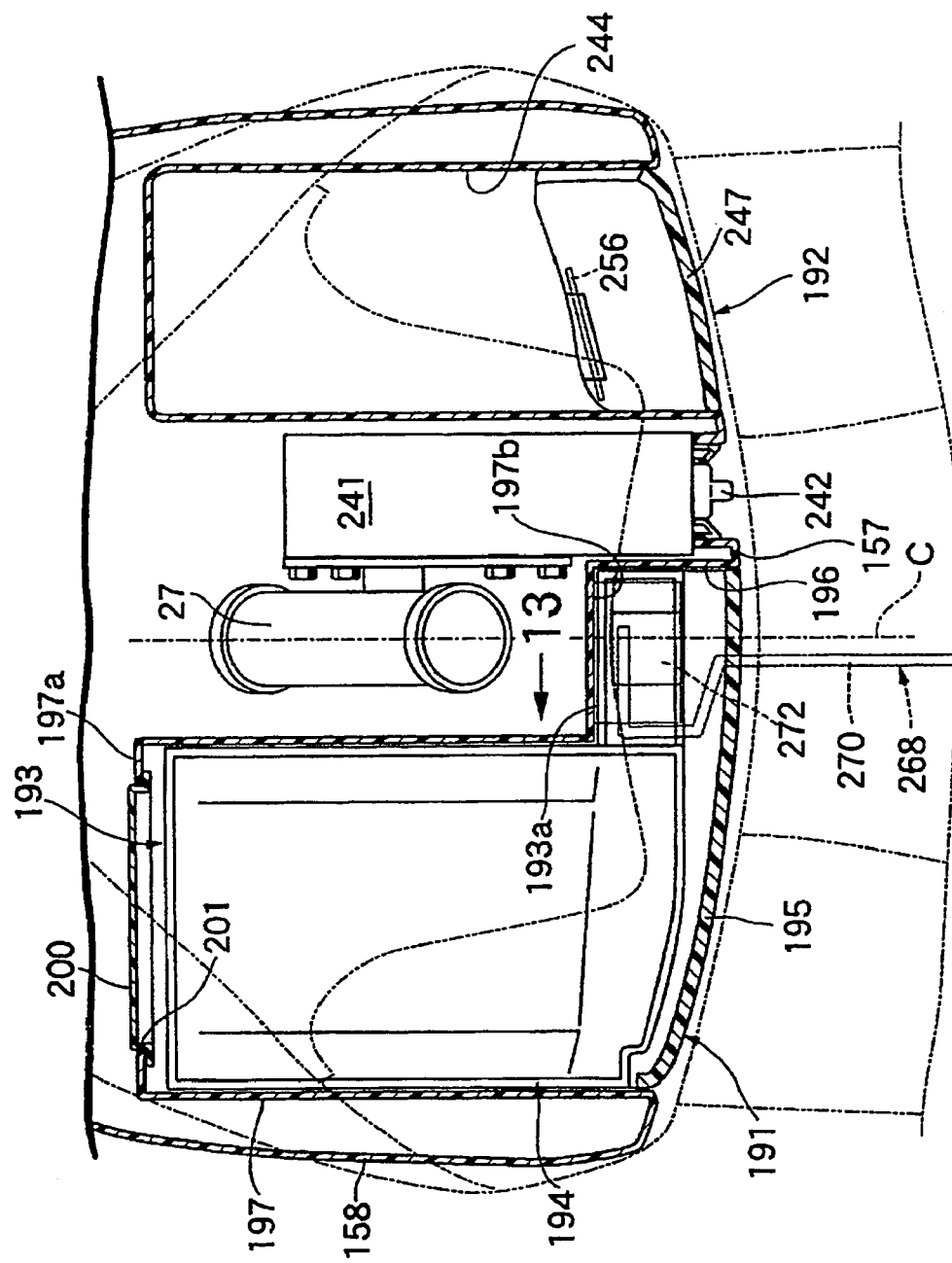
FIG. 10 is a schematic section along line 10—10 of FIG. 9.
Figure 11:
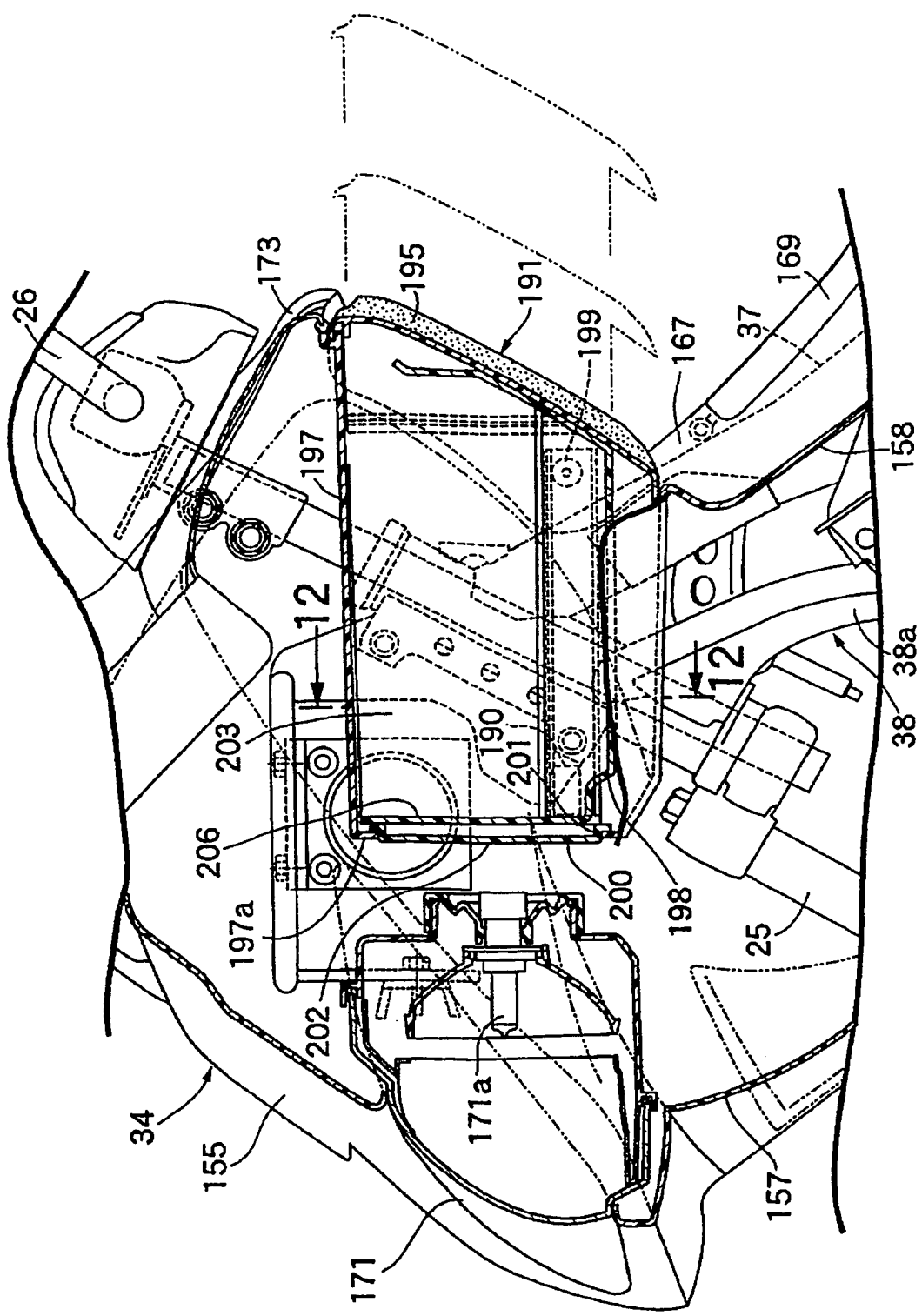
FIG. 11 is a section along line 11—11 of FIG. 9.
Figure 12:
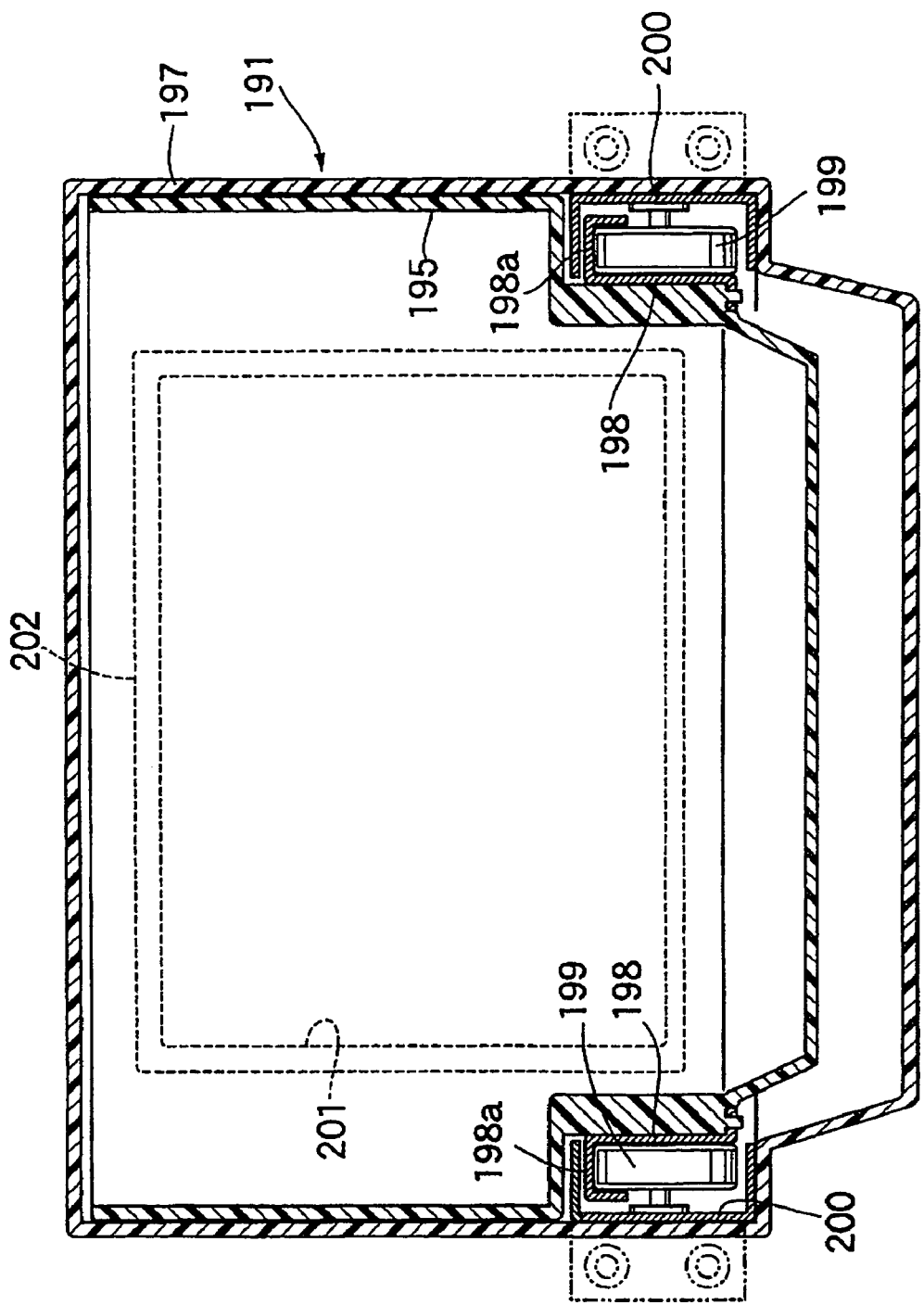
FIG. 12 is a section along line 12—12 of FIG. 11.

In the front part of the middle in the widthwise direction of the pillion 33, a cover 146 is provided having a notch, see FIGS. 8 and 9, to let the striker 141 be inserted retrievably and is fitted so as to cover the seat locking mechanism 142 from above in the opened state of the rider's seat 32.

Figure 7:
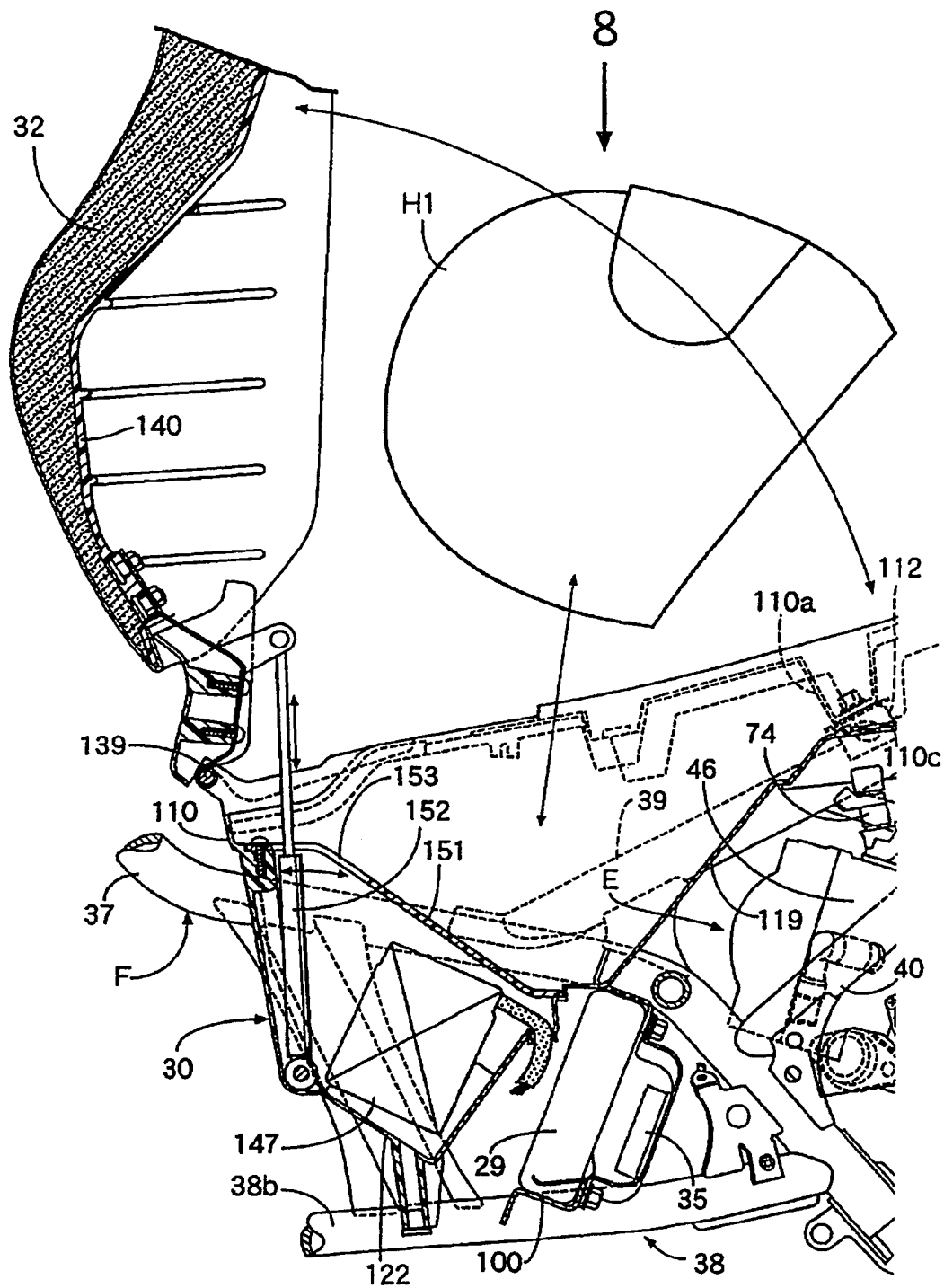
FIG. 7 is an enlarged view of the essential part of FIG. 5 in a state in which the front seat is opened.

With reference to FIGS. 7 and 8 together, the fuel tank 28 is disposed in the vicinity of step floors 159 and ahead of the storage box 30. A front bulged portion 122 bulging forward to the vicinity of the bottom of the fuel tank 28 is disposed underneath the front end of the storage box 30 so as to be arranged between the fuel tank 28 and the radiator 29. A battery 147 is housed in the front bulged portion 122. Thus, the battery 147 is arranged between the fuel tank 28 and the radiator 29. The front bulged portion 122 also houses, in addition to the battery 147, electrical units 148, 149, 150 and so forth.

A second maintenance lid 151 to partition between the front bulged portion 122 and the front helmet storage part 119 fitted to the bottom wall of the box body 110 in the storage box 30 to be opened. By opening the second maintenance lid 151 in a state in which the rider's seat 32 is opened, maintenance work on the battery 147 and electrical units 148 through 150 in the front bulged portion 122 is made possible.

A damper rod 152 is provided to assist in the opening/closing operations of the rider's seat 32 by enabling the rider's seat 32 to be opened a little and, when the rider's seat 32 is to be closed, slowing down the closing speed. The damper rod 152 is disposed between the front part of the rider's seat 32 and the storage box 30. The lower part of the damper rod 152 is accommodated into the front bulged portion 122 with a slit 153 to enable the damper rod 152 to be inserted by allowing displacement of the damper rod 152 accompanying the opening/closing of the rider's seat 32. The lower part of the damper rod 152 is provided in the second maintenance lid 151.

Referring to FIG. 1 again, the body cover 34 is provided with a front cover 155 for covering the front part of the head pipe 27 and the upper part of the front wheel WF. A pair of left and right front side covers 156 . . . are joined to the left and right sides of the front cover 155. An inner cover 157 is provided for covering the head pipe 27 from behind to be continuous to front side covers 156. . . . Leg shields 158 . . . are joined to the two front side covers 156 . . . and the inner cover 157 so as to cover the front of the legs of the rider seated in the rider's seat 32. A pair of left and right floor center covers 160 . . . extend rearwardly continuous from the leg shields 158 . . . and constituting the step floors 159 . . . at their lower ends. A pair of left and right floor side covers 161 . . . hang downwardly from the outer edges of the step floors 159 . . . with a pair of left and right passenger steps 162 . . . disposed on the rear parts of the step floors 159. . . . A pair of left and right body side covers 163 . . . are arranged underneath the two sides of the seating 31 and are continuous to the floor side covers 161 . . . to extend rearwardly. A rear lower cover 164 is linked to the rear lower parts of the body side covers 163 . . . with a rear upper cover 165 arranged between the rear parts of the rear bulging part 121 and the grab rail 118 of the storage box 30. A rear center cover 166 is arranged between the pair of left and right tail lamp units 123 . . . and is continuous to the rear upper cover 165 so as to be continuous to the narrow width portion 121a in the rear bulging part 121 of the storage box 30 so as to cover the storage box 30 from behind.

A floor tunnel part 167 that is caused by part of the leg shields 158 . . . and the floor center covers 160 . . . to rise between the step floors 159 . . . is formed to be arranged from behind the head pipe 27 to underneath the front end of the seating 31 and to be positioned above the fuel tank 28 and the radiator 29. A fuel refill lid 169 for enabling the refilling of the fuel tank 28 with fuel by opening the fuel refill cap 168 which the fuel tank 28 is provided with at its top end is openably fitted to the floor tunnel part 167 with a hinge cover 170 covering the hinged part of the rider's seat 32 to the storage box 30 that is joined to the rear end of the floor tunnel part 167.

Head lamps 171 . . . are arranged between both sides of the front part of the front cover 155 and the pair of left and right front side covers 156 . . . with winkers 172 . . . arranged underneath the head lamps 171 . . . in the front parts of the two front side covers 156. . . . A panel 173 for arranging meters and gauges is joined to the upper parts of the front cover 155, the two front side covers 156 . . . , the inner cover 157 and the leg shields 158 . . . with a meter visor 173a being integrally so provided in a rising shape in front of this panel 173. Further, a windshield 174 is arranged ahead of the meter visor 173a.

A front fender 175 covering the front wheel WF from above is supported by the front fork 25 with a pair of left and right rear view mirrors 176. . . . A switch case 177 for audio equipment control and a switch case 178 for controlling various lamps are fitted to the steering handlebar 26.

In the left floor center cover 160 out of the pair of left and right floor center covers 160 . . . , a plug maintenance lid 180 for use in the maintenance of ignition plugs 179 which the engine E is equipped with is openably fitted in a position ahead of the passenger steps 162.

A license plate 182, a reflector 183 and a license lamp 184 are fitted to a rear fender 181 covering the rear wheel WR from behind. The rear bulging part 121 of the storage box 30, together with the pair of left and right tail lamp units 123 . . . , the rear upper cover 165 and the rear center cover 166 are fitted to the rear fender 181.

In addition, on the under face of the box body 110 in the storage box 30 ahead of the rear fender 181, a pair of projecting strips 110e . . . , performing the function of the rear fender, is disposed so as to be arranged on the left and right sides of the rear wheel WR as shown in FIG. 5.

In FIG. 9 through FIG. 12, a left front storage section 191 and a right front storage section 192 are disposed with a spacing therebetween in the direction of the body width in the inner cover 157. The left front storage section 191, having a storage compartment 193 which can be drawn out of the inner cover 157 and removed, is configured as a drawer.

Figure 13:
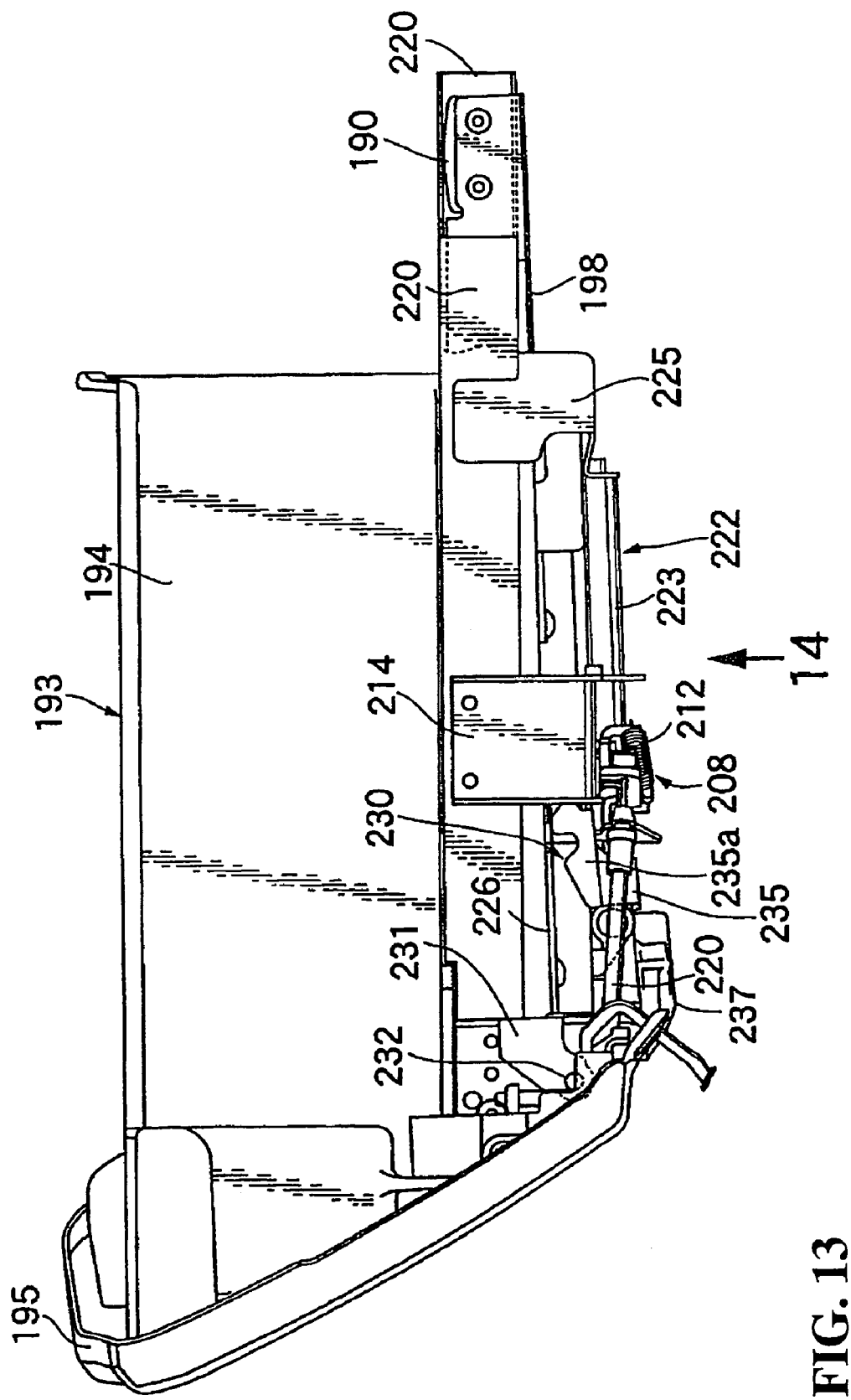
FIG. 13 is a profile of the storage compartment in the fully closed position as viewed in the arrow 13 direction of FIG. 10.
Figure 14:
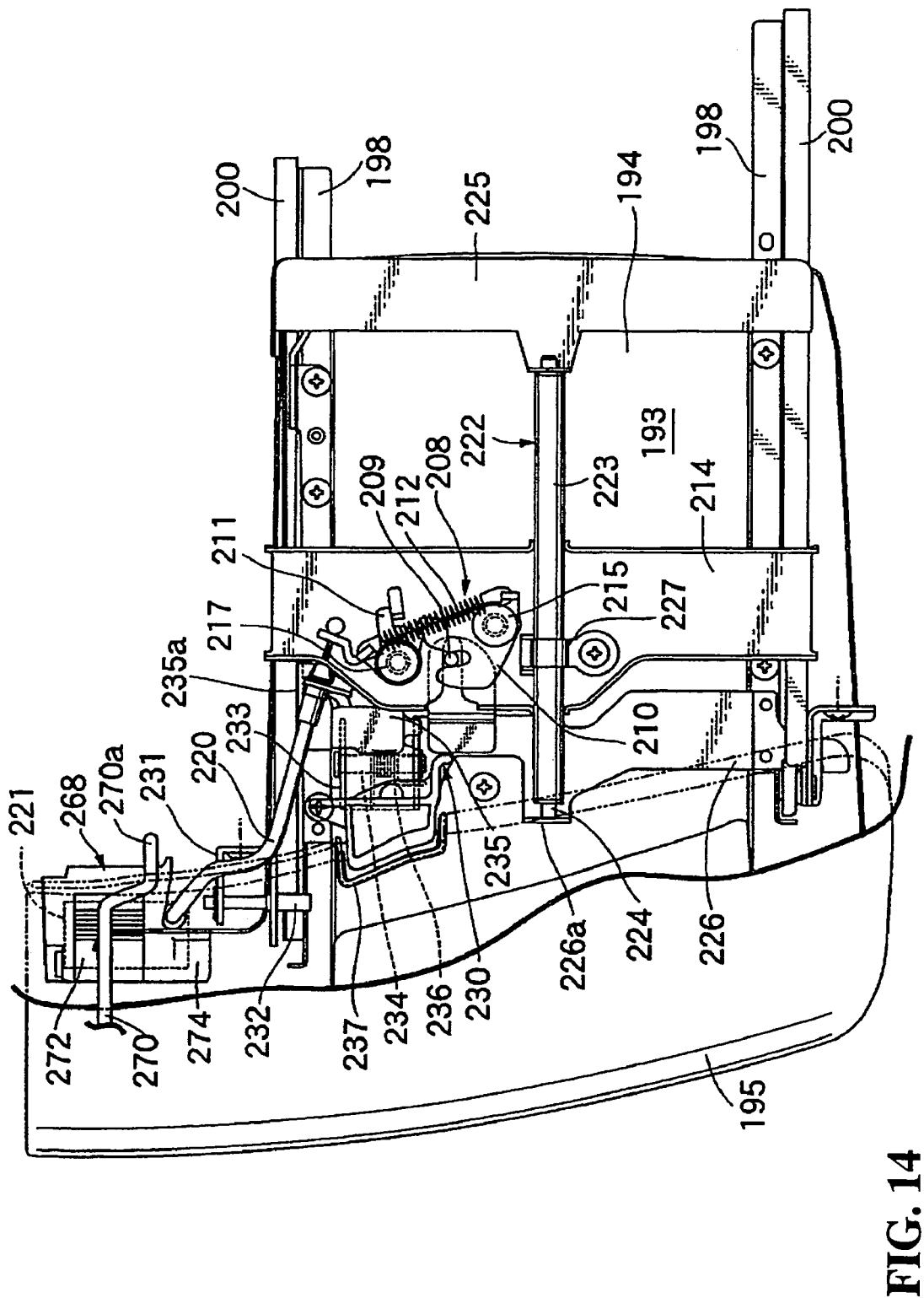
FIG. 14 is an arrow 14 view of FIG. 13.

With reference to FIG. 13 and FIG. 14 together, the storage compartment 193 is composed by fixing a decorative cover 195 as a cover member to the outer end of a case body 194 and is formed, for instance, of synthetic resin into a rectangular box shape with an open top. In the inner cover 157, a rectangular opening 196 through which the storage compartment 193 is to be inserted or drawn out is formed. A storage wall 197, formed in a rectangular sleeve shape continuous from the opening 196, is integrally linked to it with the inner end of the storage wall 197 being closed by an end wall 197a.

To the lower parts of the two sides of the case body 194, movable rails 198 and 198 extending in the back-and-forth direction are fixed, and supporting parts 198a and 198a each composed in a substantial inverted U-shape are integrally formed in other parts than the front part in the back-and-forth direction of the body at the upper ends of those the movable rails 198. . . . The immovable rails 200 and 200 extending in the back-and-forth direction matching the movable rails 198 . . . are fixed to both inner side faces of the storage wall 197. Rollers 199 and 199, to be mounted with the supporting parts 198a . . . of the movable rails 198 . . . , are axially supported by the rear parts of the immovable rails 200 . . . in the back-and-forth direction of the body. On the other hand, sliders 190 . . . in sliding contact with the upper under faces of the immovable rails 200 and 200 are fixed to the front parts of the movable rails 198 . . . in the back-and-forth direction of the body.

This arrangement enables the storage compartment 193 to slide between the fully closed position in which the decorative cover 195 of the storage compartment 193 is made continuously on substantially the same plane as the rear face of the leg shields 158 and the fully open position in which most of it has been drawn out of the storage wall 197 to be inserted into the storage wall 197 through the opening 196. It is also possible to draw the whole storage compartment 193 from the inner cover 157. Moreover, the storage compartment 193 is so formed as to cover, in its fully closed position, the head pipe 27 from its left side.

In addition, the end wall 197a of the storage wall 197 is provided with a maintenance window 201 which facilitates, when the storage compartment 193 has been drawn out of the leg shields 158, maintenance work such as replacing the bulbs 171a of the head lamps 171 positioned ahead of the end wall 197a. The window 201 is covered with a detachable lid 202.

At the outer end side of the storage compartment 193, there is disposed a bulging portion 193a bulging inwardly in the widthwise direction of the body. In addition, in the storage wall 197 there is formed, opposite the head pipe 27 from behind, a concave 197b for accommodating the bulging portion 193a when the storage compartment 193 is stored in the fully closed position.

Figure 15:
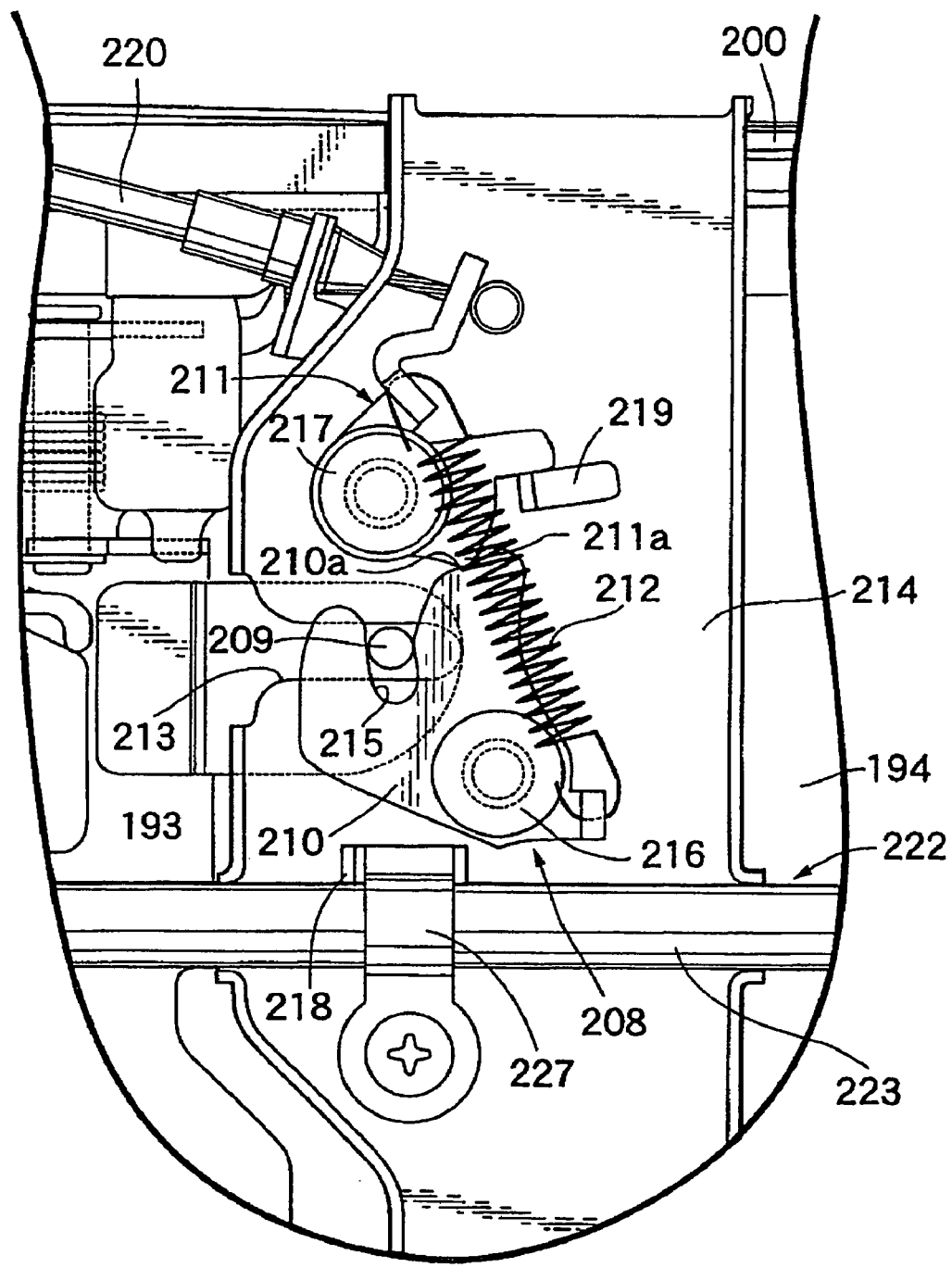
FIG. 15 is a diagram of the compartment locking mechanism when the storage compartment is in a locked fully closed state as viewed in the same direction as FIG. 14.

With reference to FIG. 15 together, between the storage compartment 193 and the inner cover 157, there is disposed a compartment locking mechanism 208 for locking the storage compartment 193 in its fully closed position. This compartment locking mechanism 208 is provided with a pin-shaped striker 209 to be stuck to the under face of the case body 194 in the storage compartment 193. A catcher 210 is supported to be rotatably toward the inner cover 157 so as to catch the striker 209 along with the sliding of the storage compartment 193 in the closing direction to the fully closed position. An engaging member 211 that can engage with the catcher 210 to hold the catcher 210 in a state of holding the striker 209 is provided together with a coil spring 212 to apply pressure to the engaging member 211 in the direction of engaging with the catcher 210.

Between the pair of immovable rails 200 and 200 fixed to the inner cover 157, a supporting frame 214 having a guide concave 213 to cause the striker 209 to be inserted along with the sliding of the storage compartment 193 in the closing direction to the fully closed position is installed so as to be opposite the under face of the case body 194. The catcher 210, arranged underneath the supporting frame 214, is rotatably supported by the supporting frame 214 via a supporting pin 216. In this catcher 210, an engaging concave 216, to engage with the striker 209 to be inserted into the guide concave 213, is disposed.

The engaging member 211 is arranged underneath the supporting frame 214 on the reverse side to the catcher 210 with respect to the guide concave 213, and is rotatably supported by the supporting frame 214 via a supporting pin 217 parallel to the supporting pin 216.

The coil spring 212 is installed in a contracted state between the catcher 210 and the engaging member 211 so as to exert a spring force for applying pressure to rotate the catcher 210 in the counterclockwise direction in FIG. 15 and applying pressure to rotate the engaging member 211 in the clockwise direction in FIG. 15. The supporting frame 214 is provided with a stopper 218 for restricting the end of the catcher 210 rotating in the counterclockwise direction by the spring force of the coil spring 212 and a stopper 219 for restricting the end of the engaging member 211 in the clockwise direction by the spring force of the coil spring 212.

Figure 16:
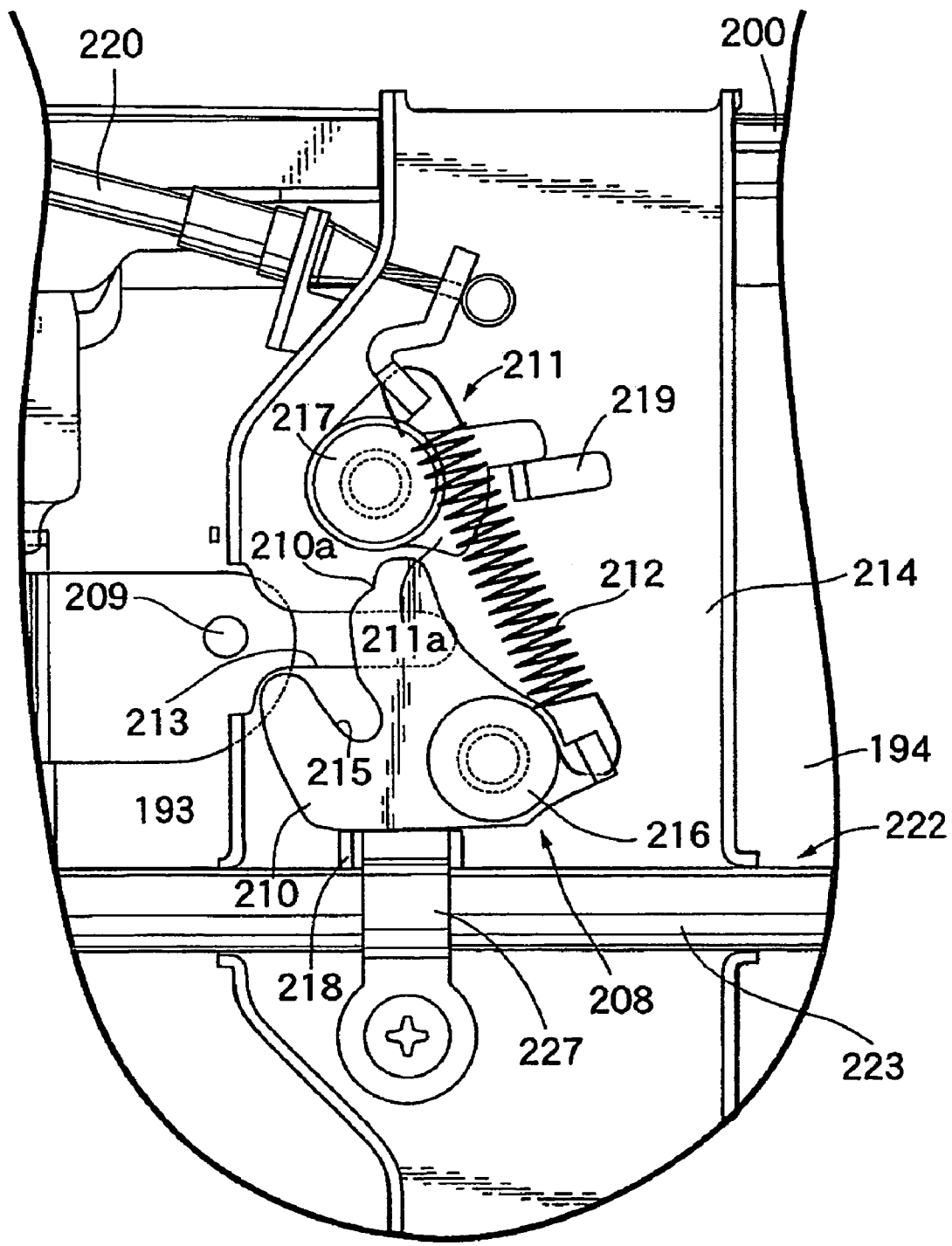
FIG. 16 is a diagram matching FIG. 15 when the compartment locking mechanism is in a state of being released from locking.

The catcher 210, in a state in which the striker 209 is off the guide concave 213 as shown in FIG. 16, has been rotated to the rotation restriction end in contact with the stopper 218 by the spring force of the coil spring 212. In this state, the open end of the engaging concave 215 is in a position overlooking the guide concave 213. Moreover, in the part of the catcher 210 toward the engaging member 211, there is disposed an engaging step 210a overlooking the front in the direction of rotational pressure by the spring force of the coil spring 212, the counterclockwise direction in FIG. 15 and FIG. 16. The engaging member 211 is provided with an engaging stub 211a which restricts the rotation of the catcher 210 in the direction of rotational pressure of the catcher 210 by engaging with the engaging step 210a.

When the striker 209 is off the guide concave 213 as shown in FIG. 16 in a state in which the engaging member 211 is not caused to exert an unlocking force, the engaging member 211 is in a position of having undone the engagement of the engaging stub 211a with the engaging step 210a. When the engaging member 211 shifts from the position indicated by the striker 209 to the position of entering into the guide concave 213 as shown in FIG. 15, the catcher 210 goes over the engaging stub 211a by coming into contact with the engaging stub 211a of the engaging member 211 and thereby rotating the engaging member 211 in the counterclockwise direction against the spring force of the coil spring 212. After the catcher 210 has gone over the engaging stub 211a, the engaging member 211 is rotated in the clockwise direction by the spring force of the coil spring 212 towards the side of coming into contact with the stopper 219 to cause the engaging stub 211a to engage with the engaging step 210a of the catcher 210. In this state, even if an external force in the opening direction is brought to work on the storage compartment 193 and an attempt is made to rotate the catcher 210 in the counterclockwise direction via the striker 209, the catcher 210 will not rotate the striker 209 in the counterclockwise direction in FIG. 15 to cause the engaging concave 215 to come off because the rotation of the engaging member 211 whose engaging stub 211a with the engaging step 210a in the clockwise direction is inhibited by the stopper 219. Thus, the fully closed state of the storage compartment 193 is locked by the compartment locking mechanism 208.

To release the compartment locking mechanism 208 from the locked state, an unlocking force to cause the engaging member 211 to go off the stopper 219, namely, to rotate it in the counterclockwise direction can be brought to work on the engaging member 211, and the unlocking force can be brought to work from a first electric actuator 221 via a transmission cable 220 linked to the engaging member 211.

The first electric actuator 221, when it operates, exerts an unlocking force in the direction of pulling the transmission cable 220. If the transmission cable 220 is pulled by the first electric actuator 221 in the locked state of the compartment locking mechanism 208, the engaging member 211, while working to rotate the catcher 210 in the clockwise direction against the spring force of the coil spring 212, will rotate in the counterclockwise direction to cause the engaging stub 211a to go over the engaging step 210a. In addition, when the engaging stub 211a has gone over the engaging step 210a, the catcher 210 will be caused by the spring force of the coil spring 212 to thrust the striker 209 in the direction of going off the guide concave 213 as shown in FIG. 16 and rotate in the counterclockwise direction to come into contact with the stopper 218.

Thus, by causing the first electric actuator 221 to work in the locked state of the compartment locking mechanism 208, an unlocking force is brought to work on the compartment locking mechanism 208 to undo the locked state. The striker 209, namely the storage compartment 193, is slightly thrust out of the fully closed position in the opening direction by the spring force of the coil spring 212 which the locking mechanism 208 is provided with.

Between the storage compartment 193 and the inner cover 157, there is disposed spring means 222 which applies a spring pressure to the storage compartment 193 in the fully opening direction in a state in which the storage compartment 193 is in the fully closed position. The springing means 222 is provided with a sleeve 223 extending in the back-and-forth direction of the body. A rod 224, which makes possible relative shifting in the axial direction within a limited range along the back-and-forth direction of the body, is slidably snapped into the sleeve 223 and partly projects from the rear end of the sleeve 223 in the back-and-forth direction of the body. A spring (not shown), provided between the sleeve 223 and the rod 224, applies pressure to the rod 223 rearwardly in the back-and-forth direction of the body.

Between the pair of immovable rails 200 and 200 ahead of the supporting frame 214 in the back-and-forth direction of the body, a front supporting frame 225 is installed so as to be positioned lower than the storage compartment 193 which is in the fully closed position. The front end of the sleeve 223 is linked to the front supporting frame 225 in a fixed way with the middle part in the axial direction of the sleeve 223 being held by a holding member 227 fitted to the supporting frame 214. Further, farther rearwardly the supporting frame 214 in the back-and-forth direction of the body and between the pair of movable rails 198 and 198, there is installed a rear supporting frame 226 positioned underneath the storage compartment 193. This rear supporting frame 226 is provided with a contact plate part 226a to come into contact with the rear end of the rod 224 in a position near the fully closed position when the storage compartment 193 has shifted toward the fully closed position.

With such a spring means 222, when the compartment locking mechanism 208 is released from the locked state in a state in which the storage compartment 193 is in the fully closed position, the spring force of the coil spring 212 of the compartment locking mechanism 208 and the spring pressure of the spring means 222 work on the storage compartment 193, and the storage compartment 193 slightly slides from the fully closed position in the opening direction. Thus, the storage compartment 193 can be drawn out after that.

Figure 17:
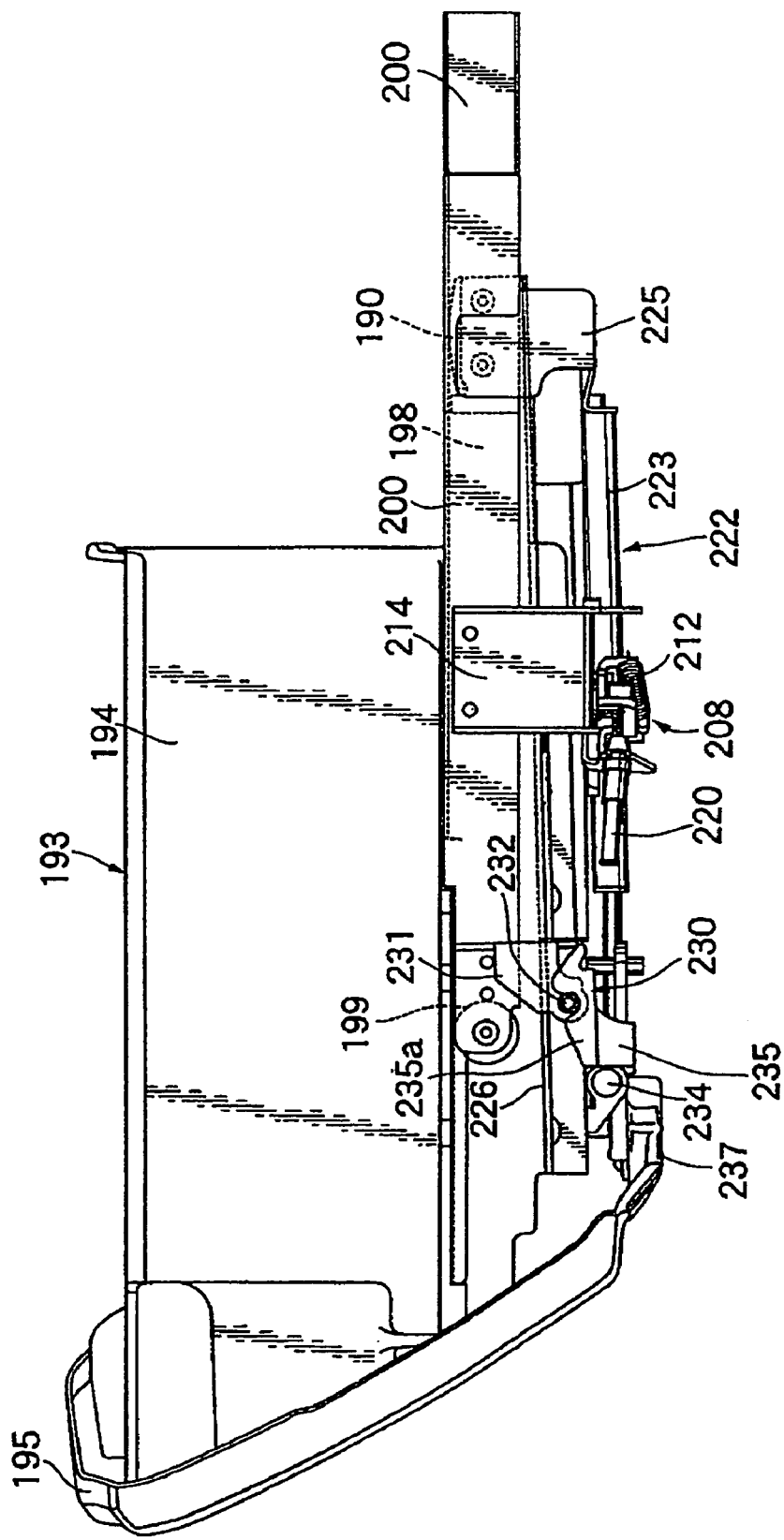
FIG. 17 is a profile matching FIG. 13 in a state in which the storage compartment is temporarily held by a holding mechanism in approximately the middle between the fully closed position and the fully open position.
Figure 18:
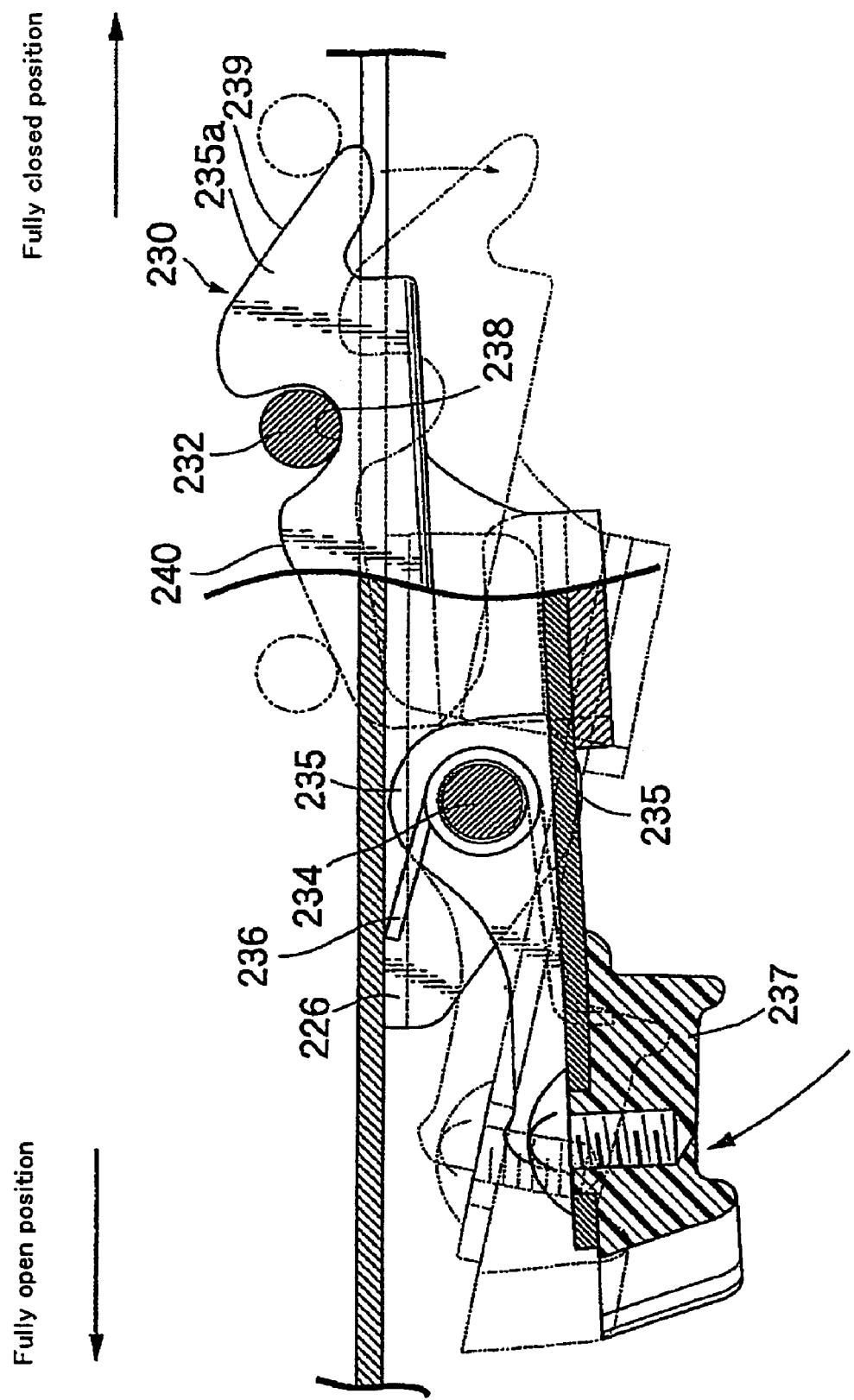
FIG. 18 is a longitudinal section for showing the configuration of the holding mechanism.

In FIGS. 17 and 18, between the storage compartment 193 and the inner cover 157, there is provided a holding mechanism 230 for temporarily holding the storage compartment 193, when it has been operated for release from the fully closed position, in a middle position between the fully closed position and the fully open position. In this embodiment, in substantially the central part between the fully closed position and the fully open position, the position of the storage compartment 193 in it is temporarily held by this holding mechanism 230 and is set so that the knees of a person of no taller than 175 cm, the height range of 90% of the Japanese population, may not hit the storage compartment 193 when seated on the rider's seat 32, see the chain line indication in FIG. 1.

The holding mechanism 230 is provided with an engaging shaft 232 which is supported by a supporting member 231 stuck to the end of the immovable rail 200, positioned on the righthand side as viewed from the rear in the back-and-forth direction of the body, out of the pair of left and right immovable rails 200 and 200 fixed to the inner cover 157 and extending in the widthwise direction of the body. An oscillatory engaging member 235 is oscillatably supported by a bracket 233 stuck to the rear supporting frame 226 fixed to the storage compartment 193 via a spindle 234 having an axis parallel to the engaging shaft 232. A torsion spring 236 is disposed between the bracket 233 and the oscillatory engaging member 235 so as to apply pressure to the oscillatory engaging member 235 in the counterclockwise direction in FIGS. 17 and 18.

The engaging shaft 232, with its one end projecting from the immovable rail 200 toward the storage compartment 193, is supported by the supporting member 231. Further, the oscillatory engaging member 235, integrally having an engaging portion 235a bulging from the bracket 233 toward the immovable rail 200, is rotatably supported by the bracket 233 with the rotating end of the oscillatory engaging member 235, subjected to rotational pressure by the spring force of the torsion spring 236 in the direction of turning upward the engaging portion 235a, namely in the counterclockwise direction of FIGS. 17 and 18, is restricted by the coming into contact of the oscillatory engaging member 235 with the rear supporting frame 226.

On the upper side edge of the engaging portion 235a, there are formed an engaging concave 238 for engaging the engaging shaft 232 by spring means with a forward guide face 239 arranged ahead of the engaging concave 238 in the back-and-forth direction of the body. A rearward guide face 240 is arranged behind the engaging concave 238 so as to sandwich the engaging concave 238 between the forward guide face 239 and itself.

In a state in which the oscillatory engaging member 235 is at an end under rotational pressure by the torsion spring 236, the forward guide face 239 is formed in an inclined face where the position increases in height as its shifts rearwardly, while the rearward guide face 240 is so formed in an inclined face whose slope is easier than the forward inclined face 239 that the position decreases in height as its shifts rearwardly. The inner side face of the engaging concave 238 toward the rearward inclined face 240 is formed to be substantially parallel to the forward guide face 239 in a state in which the oscillatory engaging member 235 is at an end under rotational pressure by the torsion spring 236.

With such a holding mechanism 230, when the storage compartment 193, in the fully closed position, is subjected to an opening operation, coming contact of the engaging shaft 232 in a fixed position with the rearward guide face 240 causes the oscillatory engaging member 235 to be rotationally driven in the direction of pressing down the engaging portion 235a against the spring force of the torsion spring 236, namely in the clockwise direction of FIG. 18. When the storage compartment 193 slides farther towards the fully open position while keeping the rearward guide face 240 in sliding contact, the fall of the engaging shaft 232 from the rearward guide face 240 into the engaging concave 232 causes the oscillatory engaging member 235 to be rotated in the direction of thrusting upward the engaging portion 235a, namely in the counterclockwise direction of FIG. 18, by the spring force of the torsion spring 236, and the spring-driven engagement of the engaging shaft 232 with the engaging concave 238 causes the storage compartment 193 to be temporarily held.

To undo such a temporarily held state, the oscillatory engaging member 235 can be forcibly rotated against the spring force of the torsion spring 236 as indicated by the chain line of FIG. 18, and by doing so the engaging shaft 232 is released from the spring-driven engagement with the engaging concave 238, making it possible to slide the storage compartment 193 toward the fully open position.

When the storage compartment 193 in the fully open position is pressed into the fully closed position, the engaging shaft 232 comes into contact with the forward guide face 239 on the way, but, as the forward guide face 239 is an inclined face down forward, further pressing-in of the storage compartment 193 would cause the oscillatory engaging member 235 to rotate so as to press down the engaging portion 235a, and the engaging concave 238 falls into the engaging shaft 232. However, as the inner side face of the engaging concave 238 towards the rearward inclined face 240 is inclined to be substantially parallel to the forward guide face 239, further pressing-in of the storage compartment 193 causes the engaging shaft 232 to so rotate the oscillatory engaging member 235 and come into sliding contact with the rearward guide face 240 as to further press down the engaging portion 235a, making it possible to press the storage compartment 193 into the fully closed position.

In addition, in releasing the temporary holding of the storage compartment 193 by the holding mechanism 230, a synthetic resin-made hold releasing member 237 fastened to the oscillatory engaging member 235 can be rotated in the direction indicated by an arrow in FIG. 18. The hold releasing member 237 is arranged on the under face of the storage compartment 193 in a position closer to the body center line C and the rear part of the body.

On the reverse side to the left front storage section 191 and in the vicinity of the head pipe 27, there is arranged a handlebar locking module 241 that can make the steering operation of the steering handlebar 26 impossible. The right front storage section 192 is arranged so as to sandwich the handlebar locking module 241 between the left front storage section 191 and itself.

Figure 19:
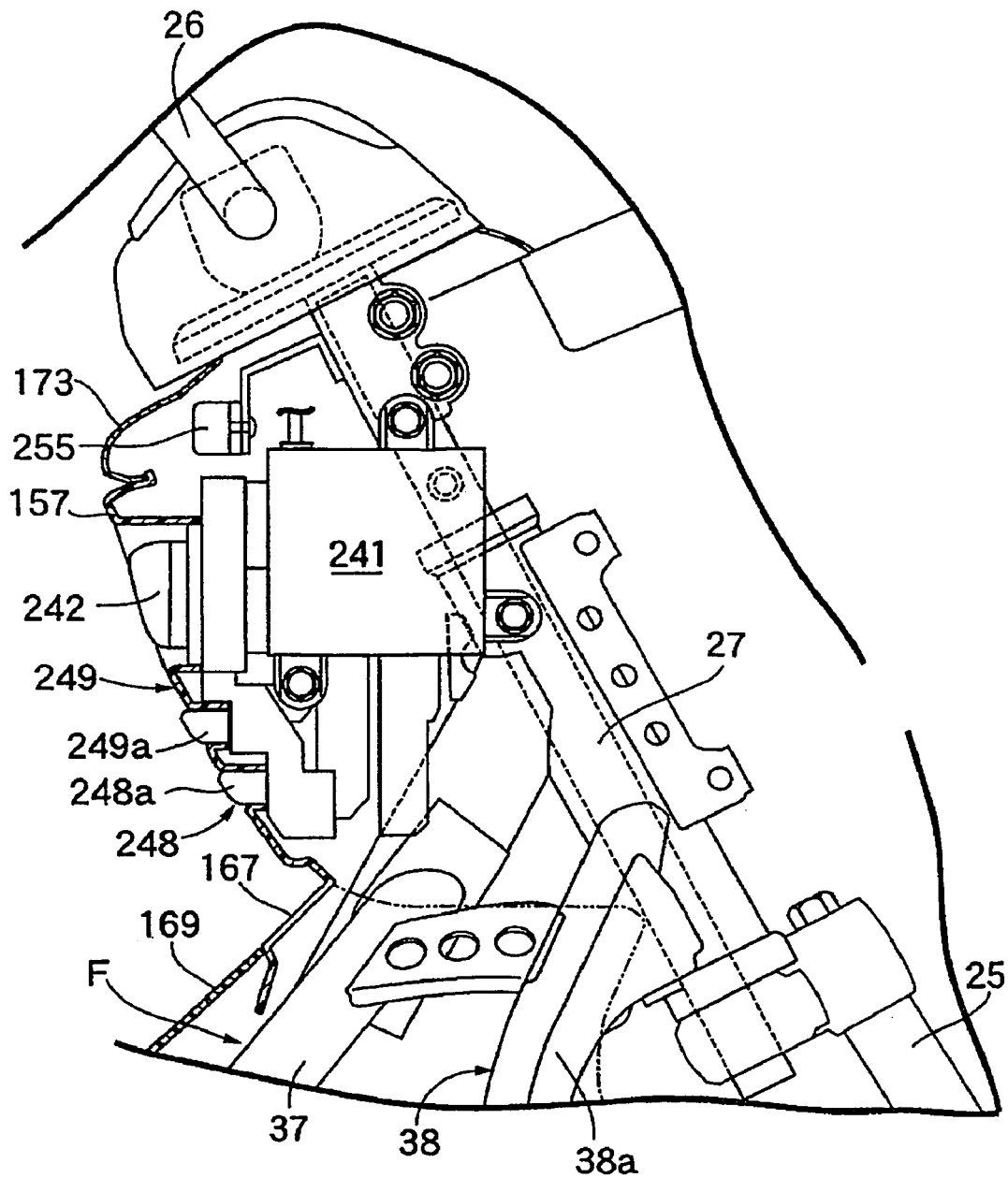
FIG. 19 is a section along line 19—19 of FIG. 9.

In FIG. 19, the handlebar locking module 241 makes a steering operation of the steering handlebar 26 possible in response to an operation under prescribed conditions of a the knob 242 for smart entry that is arranged on the inner cover 157 between the left and right front storage sections 191 and 192 for making it possible to start the engine E. The first electric actuator 221 is arranged on the handlebar locking module 241.

Figure 20:
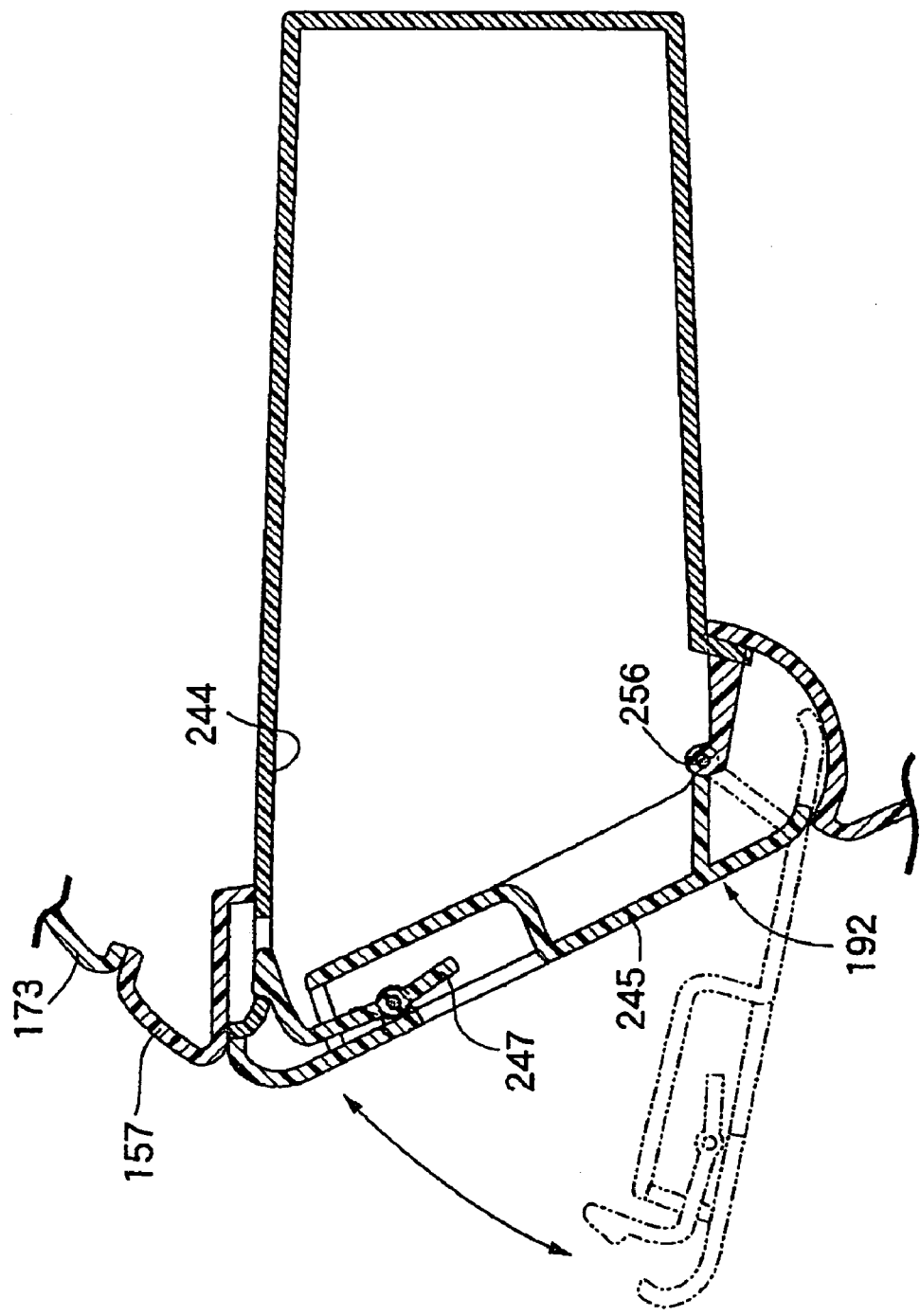
FIG. 20 is a section along line 20—20 of FIG. 9.

In FIG. 20, the right front storage section 192 is so composed that an accommodating concave 244 formed in the inner cover 157 is openably covered by a lid member 245 hinged onto the inner cover 157. The accommodating concave 244 is formed so as to be smaller than the storage compartment 193 of the left front storage section 191 and to slightly narrow toward the front end.

The lid member 245 is hinged onto the inner cover 157 via a pivot 256 to be rotatable between the open position for opening the accommodating concave 244 by rotating downwardly, as indicated by the chain line of FIG. 20. The closed position for closing the accommodating concave 244 is indicated by the solid line of FIG. 20. A knob 247 is provided for facilitating the rotating operation. The knob 247 is fitted to the lid member 215.

Underneath the knob 242 for smart entry, namely beside the left front storage section 191 and between the left front storage section 191 and the right front storage section 192, a plurality of unlocking buttons for releasing a plurality of storage sections including the left front storage section 191, in this embodiment the left front storage section 191 and the storage box 30, from the locked state are arranged on the inner cover 157. In this embodiment, a first unlocking button 248a for the left front storage section 191 and a second unlocking button 249a for the storage box 30 are arranged vertically in positions offset from the body center line C either leftwardly or rightwardly, right ward in this embodiment, with the first unlocking button 248a in the lower position.

The first and second unlocking buttons 248a and 249a constitute part of first and second unlocking switches 248 and 249 for varying the switching mode by operating the operational buttons 248a and 249a. The first and second unlocking switches 248 and 249 are so fitted to the inner cover 157 that the first and second unlocking buttons 248a and 249a overlook the outer face of the inner cover 157. In addition, the first and second unlocking buttons 248a and 249a are formed to be longer in the lateral dimension.

The first unlocking button 248a for releasing the left front storage section 191 from the locked state, the locking mechanism 208, which the left front storage section 191 is equipped with, and the first electric actuator 221 for causing an unlocking force to work on the locking mechanism 208 are arranged at substantially the same heights.

Figure 21:
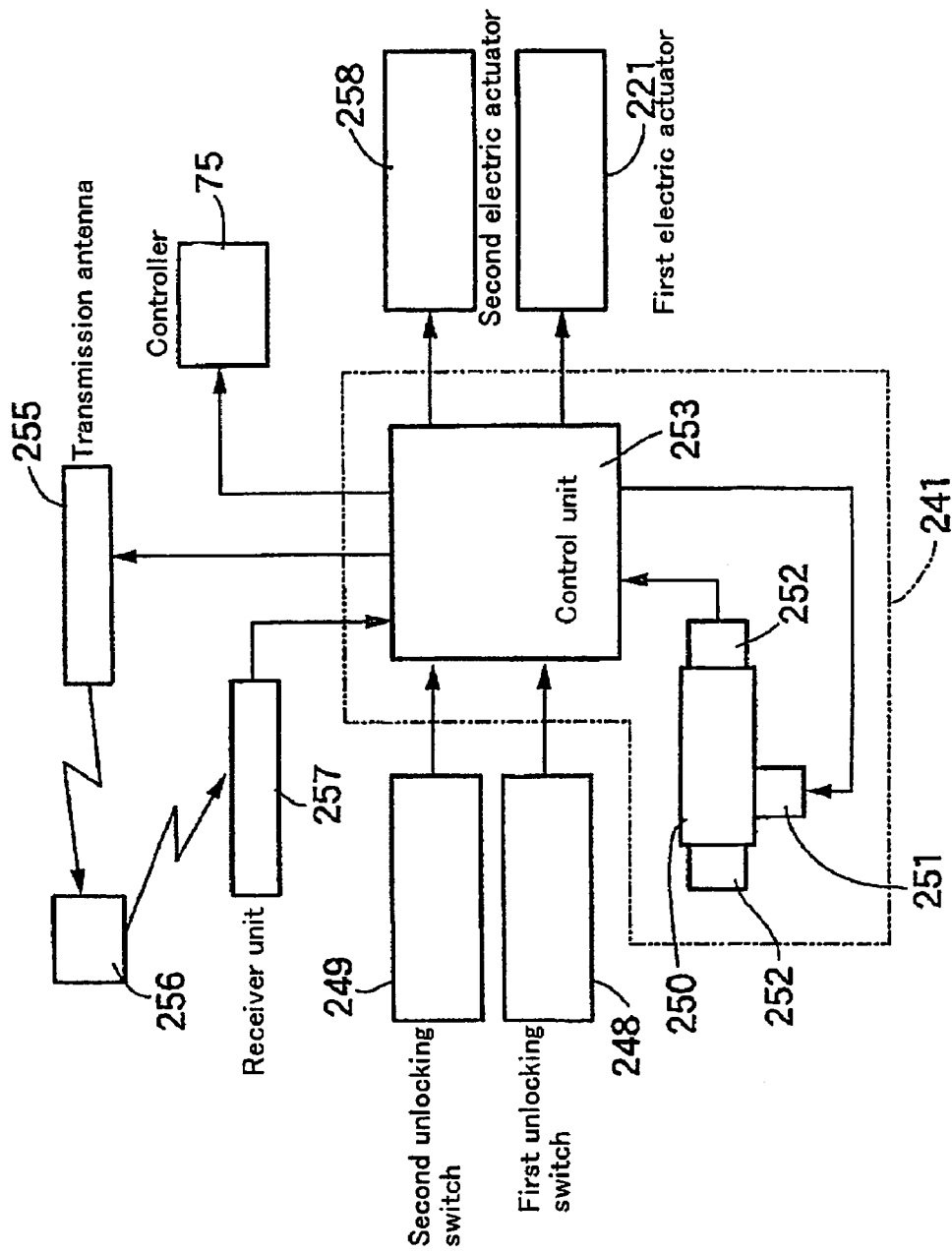
FIG. 21 is a diagram showing the configuration of a smart entry system.

In FIG. 21, the controller 75 to be accommodated in the control box 76 is fitted to the throttle body 68 and the handlebar locking module 241 and the first and second unlocking switches 248 and 249 constitute part of the smart entry system. The handlebar locking module 241 permits a rotational operation with the knob 242, and is provided with a cylinder lock 250 which, when moved to in a rotational operation, releases the handlebar 26 from the state of being locked to the head pipe 27. A lock solenoid 251 is provided which can make the rotation of the cylinder lock 250 impossible. A main switch 252 which is operated for switching in response to the rotation of the cylinder lock 250, and a control unit 253 into which signals from the main switch 252 are entered are provided. The lock solenoid 251 is controlled by the control unit 253.

The control unit 253 controls a transmission antenna 255 so as to transmit a signal urging ID signal transmission from a regular portable transmitter 256 carried by the vehicle user. In addition, the result of a signal reception by a receiver unit 257 for receiving signals from the portable transmitter 256 is entered into the control unit 253. The control unit 253, when it has confirmed that the ID signal transmitted from the portable transmitter 256 is a prescribed signal, operates the lock solenoid 251 so as to permit rotational operation of the cylinder lock 250 with the knob 242.

Also the control unit 253, when it has confirmed that the ID signal transmitted from the portable transmitter 256 is a prescribed signal, makes it possible, in response to conduction by the main switch 252, to control the engine E with the controller 75. In response to a signal from the first unlocking switch 248 matching the operation of the first unlocking button 248a in the conducting state of the main switch 252, the first electric actuator 221 is caused to operate. In addition, in response to a signal from the second unlocking switch 249 matching the operation of the second unlocking button 249a in the conducting state of the main switch 252, a second electric actuator 258 is caused to operate. The second electric actuator 258 pulls the transmission cable 143, see FIGS. 5 and 6, according to its operation, and thereby releases the seat locking mechanism 142 from the locked state.

Further the control unit 253, when it has confirmed that the ID signal transmitted from the portable transmitter is a prescribed signal, undoes the compartment locking mechanism 208 of the storage compartment 193 by operating the unlocking button 248a. The storage compartment 193 is made drawable from the fully closed position to an intermediate held position, and an unlocking member 272 becomes operable in that drawn-out state.

The receiver unit 257 is arranged either in the storage box 30 or in the seating 31. In this embodiment, a receiver unit accommodating part 101f formed by depressing downwardly part of the shallow bottom part 110c of the storage box 30 is disposed in the storage box 30. The receiver unit 257 is accommodated in the receiver unit accommodating part 101f. Moreover, a first maintenance lid 117 for use in maintenance work related to the engine E arranged underneath the storage box 30 is openably provided in the shallow bottom part 110c. The receiver unit 257 is accommodated in the receiver unit accommodating part 101f so as to be covered by part of the first maintenance lid 117.

The transmission antenna 255 is arranged in a position away from the handlebar locking module 241. In this embodiment, it is arranged above the handlebar locking module 211, for instance, immediately underneath the panel 173 constituting part of the body cover 34.

Figure 22:
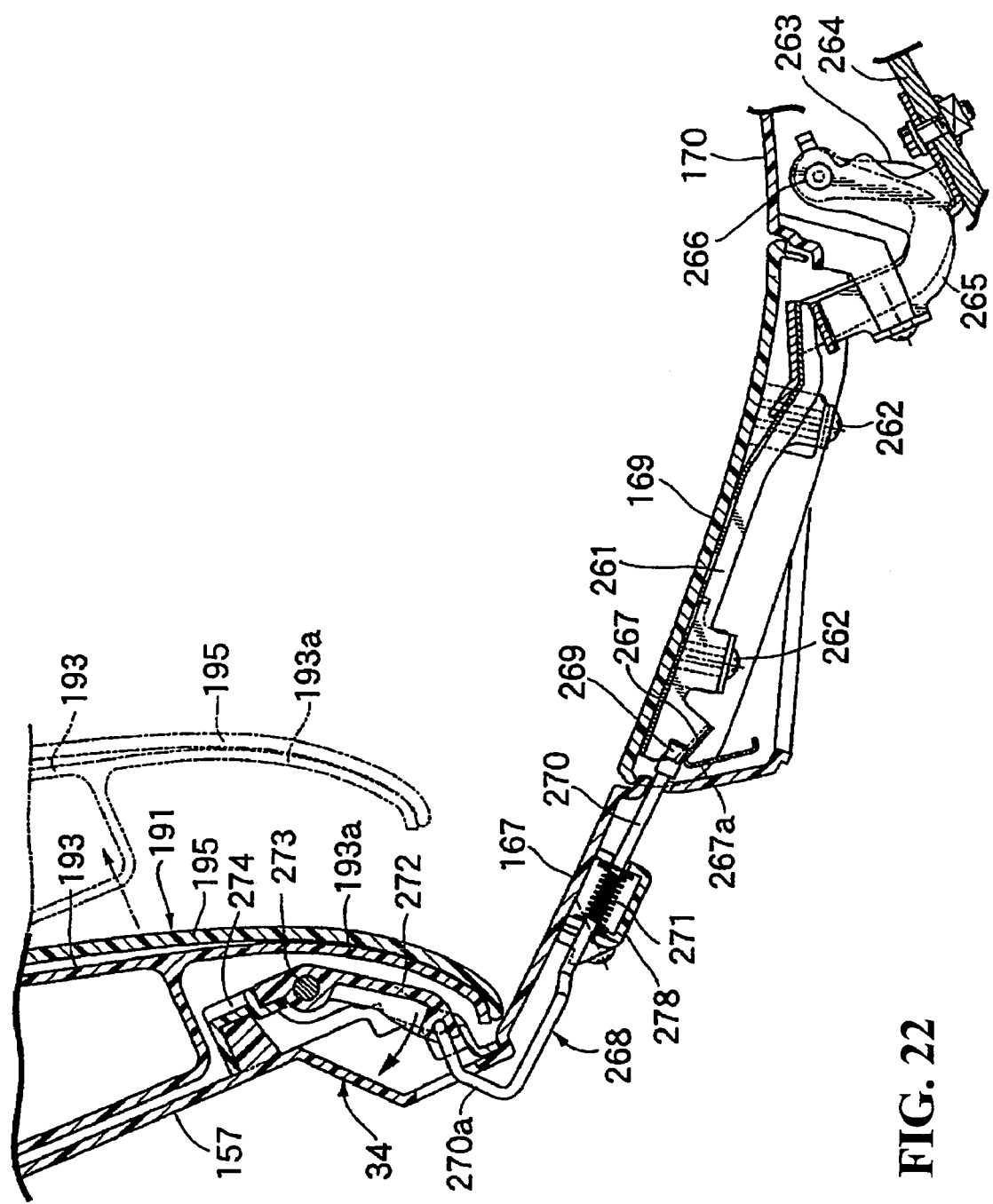
FIG. 22 is a section along line 22 of FIG. 9.

In FIG. 22, the fuel refill lid 169 is fastened to a frame member 261 extending in the back-and-forth direction of the body with a plurality of screw members 262. . . . A hinge arm 263, continuous from the rear end of the frame member 261 in the back-and-forth direction of the body, is rotatably supported via a spindle 266 by a supporting plate 264 fixed to the body frame F and a bracket 265 fixed to the hinge cover 170.

The front end of the frame member 261 in the back-and-forth direction of the body is provided with an engaging portion 267. A lid locking mechanism 268 for locking the closed state of the fuel refill lid 169 is provided for holding the fuel refill lid 169 in a locked state by engaging with the engaging portion 267.

The lid locking mechanism 268 is provided with a rod 270 extending in the back-and-forth direction of the body ahead of the fuel refill lid 169 and underneath the floor tunnel part 167. A spring 271 for applying pressure to the rod 270 rearwardly in the back-and-forth direction of the body is provided together with a synthetic resin-made cap 269 that can engage with the engaging portion 267 that is fitted to the rear end of the rod 270.

By the operation of the unlocking member 272, a force works on the rod 270 against the spring force of the spring 271 in the direction of undoing the engagement of the cap 269 with the engaging portion 267, namely, a forward force. The unlocking member 272 is arranged on the inner cover 157 so as to be covered, when the decorative cover 195 arranged on the inner cover 157 is in a closed state. The decorative cover 195 is in a position between the left and right front storage sections 191 and 192 and either to the left or right, left in this embodiment, of the body center line C. In this embodiment, as viewed from the rear in the back-and-forth direction of the body, the unlocking member 272 is arranged on the inner cover 157, offset from the storage compartment 193 in the left front storage section 191, and in a position at least partly overlapping the head pipe 27. When the storage compartment 193 is in the fully closed position, the decorative cover 195 is fitted to the storage compartment 193 so as to cover the unlocking member 272.

Thus, since the bulging portion 193a bulging inward in the widthwise direction of the body is to be disposed on the outer end side of the storage compartment 193 and the decorative cover 195 is to be fitted to the outer end of the storage compartment 193, a supporting case 274 is fitted to the inner cover 157 in a position where it can be covered by the bulging portion 193a, and the upper part of the unlocking member 272 is rotatably supported by this supporting case 274 via a shaft 273. Further, the rod 270 integrally has in its front part a bent portion 270a bent towards the unlocking member 272. The bent portion 270a is linked to the lower part of the unlocking member 272. Therefore in a state in which the left front storage section 191 of the storage compartment 193 has been drawn out to the intermediate opened position, the position of the chain line in FIG. 22, that is restricted by the holding mechanism 230 or a farther open position, and by having a user rotate in the direction of the arrow in FIG. 22 by pressing in the unlocking member 272 with a finger reaching the rear side of the bulging portion 193a enables the rod 270 to be operated in the direction of causing the cap 269 to move in the direction away from the engaging portion 267.

Figure 23:
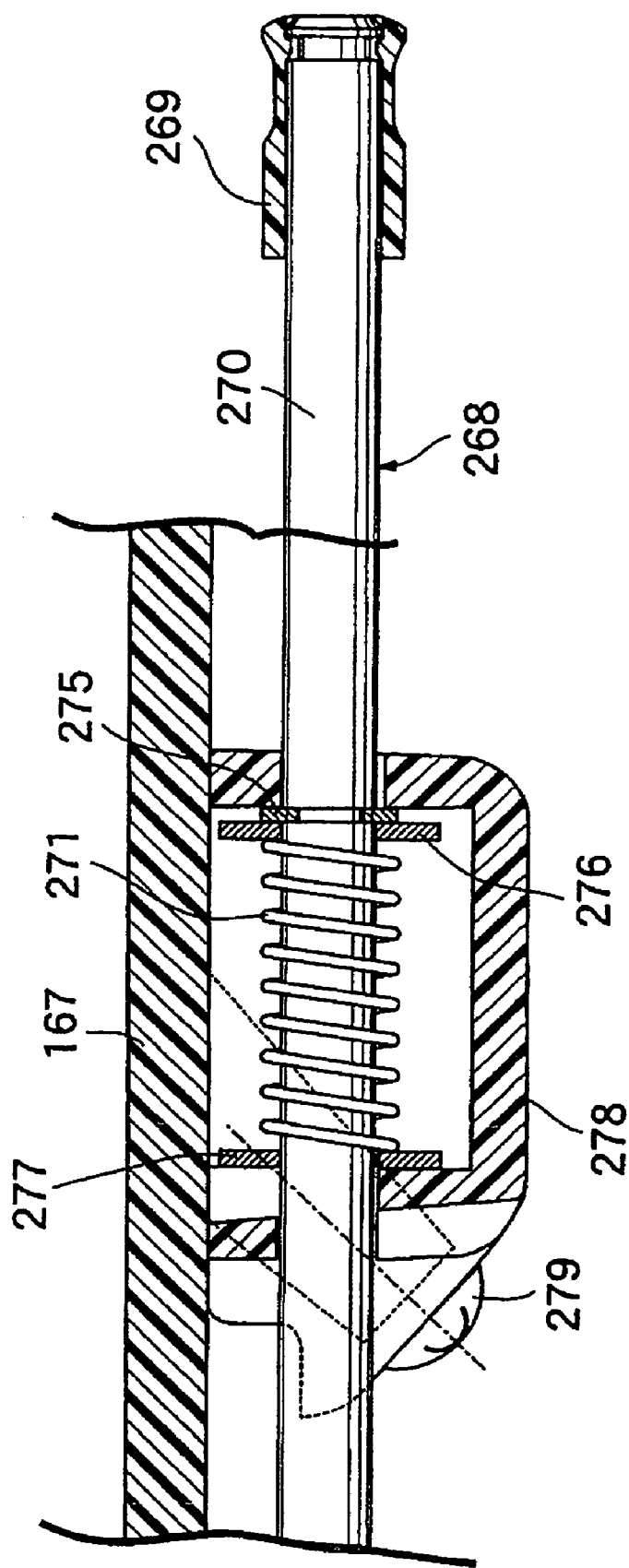
FIG. 23 is an enlarged view of the essential part of FIG. 22.

In FIG. 23, a rod holding frame 278 is fitted with a screw member 279 onto the inner face of the floor tunnel part 167 ahead of the fuel refill lid 169. The middle part of the rod 270 is held by the rod holding frame 278 to be shiftable in the axial direction. Moreover, a stop ring 275 is fitted to the rod 270 within the holding frame 278, and between a ring-shaped spring retaining member 276 which is engaged with the stop ring 275 from the front and can also be in contact and engaged with the rear wall of the rod holding frame 278 and a ring-shaped spring retaining member 277 which can be in contact and engaged with the front wall of the rod holding frame 278, the coil-shaped spring 271 surrounding the rod 270 is installed in a contracted state.

In addition, when to close the fuel refill lid 169 in an open state, it is necessary to press forward the rod 270 of the lid locking mechanism 268. However, a pressure plate part 267a for pressing rearwardly the cap 269 at the rear end of the rod 270 according to the operation to close the fuel refill lid 169 is integrally linked to the engaging portion 267 on the fuel refill lid 169 side. When the fuel refill lid 169 is closed from an open state, the pressure plate part 267a will press forward the rod 270 via the cap 269. When the fuel refill lid 169 rotates to the closed position, the spring force of the spring 271 causes the rod 270 to shift rearwardly to engage the cap 269 with the engaging portion 267, with the result that the closed state of the fuel refill lid 169 is locked.

Next is a description of the actions of this embodiment, the rear bulging part 121 bulges farther rearwardly than the supporting pipe 62 which is the upper fitting portion of the rear shock absorbers 64 to the rear end of the pillion 33. The rear part of the body frame F is disposed behind the front helmet storage part 119 arranged underneath the rider's seat 32 wherein the tandem-type seating 31 is provided with and the storage box 30 having the rear helmet storage part 120 arranged underneath the pillion 33. Thus, it is possible to accommodate in the storage box 30 long items such as golf clubs that extend rearwardly beyond the rear end of the seating 31. The golf clubs can be stored inside. Thus, the capacity of the storage box 30 is expanded. Moreover, it is made possible to store small items other than helmets in the rear part of the storage box 30. In addition, items less frequently used, such as tools, can be properly stored in the storage box 30.

Furthermore, as the rear bulging part 121 bulges rearwardly to substantially the same position as the rear end of the grab rail 118 arranged around the pillion 33, the capacity of the storage box 30 can be increased, and the rear part of the storage box 30 can be protected with the grab rail 118.

Further in the rear part of the rear bulging part 121, there is provided a narrow-width portion 121a which enters between the left and right tail lamp units 123 . . . as viewed from above, making it possible to effectively utilize the space generated between the pair of left and right tail lamp units 123 . . . to expand the capacity of the storage box 30 and making it easier to form a space for bulb replacement of the tail lamp units 123. . . .

In addition, as the storage box 30 has the upper face cover 111 arranged underneath the pillion 33 and the storage space 128 available for use depending on the attachment or detachment of the pillion 33 on the top face of the upper face cover 111, a space for the storage of small items can be secured in addition to the inside of the storage box 30 while avoiding an increase in the number of parts and a complication with respect to the structure. In addition, as the storage space 128 is formed within the first rib 127 erected on the upper face cover 111 to be endlessly continuous and the endlessly continuous second rib 129, forming a labyrinth structure in synergy with the first rib 127, hangs down from the bottom plate 33*a* of the pillion 33, infiltration of rain water, dust and the like into the storage space 128 from the surroundings can be prevented with a simple structure.

Moreover, as the illuminating device 116 for illuminating the inside of the storage box 30 is fitted to the inner side face of the storage box 30 in the part matching the front part of the upper face cover 111, the rear inside of the storage box 30 which tends to be darkened by the presence of the upper face cover 111 can be effectively illuminated without being obstructed by anything stored in the rear part of the storage box 30. Furthermore, in the part matching the front part of the upper face cover 111, the inner side face of the storage box 30 is conspicuous enough to make it readily noticeable when a bulb of the illuminating device 116 is extinguished and to identify other faults.

Further, as the rear bulging part 121 is fitted with the rear upper cover 165 and the rear center cover 166 to cover the rear bulging part 121, the pair of left and right tail lamp units 123 . . . and the rear fender 181, a plurality of members arranged around the rear part of the storage box 30 can be taken off at once by merely removing the wiring of the tail lamp units 123 . . . , making it possible to improve the maintenance ease.

The storage box 30 is provided with the shallow bottom part 110*c* arranged between the front helmet storage part 119 and the rear helmet storage part 120 and, underneath the shallow bottom part 110*c*, the throttle body 68 on which the control box 76 accommodating the controller 75 is installed and the fuel injection valve 74 are arranged with their upper end positions substantially the same. Therefore, by forming flat the shallow bottom part 110*c* between the front and rear helmet storage parts 119 and 120, it can be effectively utilized as a storage space, and moreover part of the intake line of the engine E can be effectively arranged in the space underneath the shallow bottom part 110*c*.

The lower part of the rear bulging part 121 is arranged at a lower level than the fitting portions of the upper parts of the rear shock absorber 64 to the rear part of the body frame F by forming within the rear bulging part 121 the glove compartment 124 intervening between the rising part 110*d* formed by partially raising the bottom wall of the storage box 30 and the rear helmet storage part 120. The rear helmet storage part 120 and the glove compartment 124, farther rearwardly than the rear helmet storage part 120, are partitioned from each other by the rising part 110*d* to improve the convenience of use and making it possible for small items stored in the rear glove compartment 124 to be prevented from moving back and forth by the rising part 110*d*.

As the fuel tank 28 formed long in the vertical direction as viewed sideways is arranged ahead of the storage box 30 and the front bulged portion 122 bulging forward to the vicinity of the bottom of the fuel tank 28 is provided underneath the front end of the storage box 30, the front part of the storage box 30 can be formed deep to facilitate accommodation of long items and the capacity of the storage box 30 can be expanded.

In addition, as the front bulged portion 122 can accommodate the battery 147 and other electrical units 148 through 150, the battery 147 and other electrical units 148 through 150 can be stored in the storage box 30 without obstructing the accommodation of the helmet H1 or the like.

Further, the openable fitting of the second maintenance lid 151, which partitions the inside of the front bulged portion 122 and the front helmet storage part 119 from each other, to the storage box 30 can prevent the stored items in the front bulged portion 122 and the helmet H1 stored in the front helmet storage part 119 from coming into contact with and damaging each other.

Since the lower part of the damper rod 152 extends vertically so as to assist the opening/closing of the rider's seat 32 and is accommodated into the front bulged portion 122, there is no need to secure a space for arranging the damper rod 152 outside the storage box 30. In addition, when the rider's seat 32 is opened, the risk of outside exposure of the damper rod 152 is minimized by taking care that it may not come into the way of items put into the storage box 30, making it possible to improve the looks and neatness.

Whereas the fuel tank 28 and the radiator 29 are arranged underneath the floor tunnel part 167 formed of part of the body cover 34 covering the body frame F, the body frame F is provided with the head pipe 27, the pair of left and right upper down frames 37 . . . extending downwardly and rearwardly from the head pipe 27, and the pair of left and right lower down frames 38 . . . having the inclined portions 38*a* . . . extending downwardly and rearwardly from the head pipe 27 in a position lower than the linking portion of to the upper down frames 37 . . . to the head pipe 27. The fuel tank 28 extendings vertically from the lower rear part of the head pipe 27 to the lower parts of the two lower down frames 38 . . . is surrounded by the two upper down frames 37 . . . and the two lower down frames 38 . . . and arranged in a space immediately after the front wheel WF.

Therefore, by arranging the tall fuel tank 28 immediately after the front wheel WF, the part matching the lower portion of the head pipe 27 is prevented from becoming a dead space, and an arrangement of parts making effective use of the space underneath the floor tunnel part 167 is made possible. In addition, by bringing the fuel tank 28, whose weight tends to be rather heavy, closer to the front wheel WF, the turning performance can be improved by increasing the distributed load of the front wheel WF. Furthermore, as the tall fuel tank 28 can keep the level of the remaining fuel relatively high when its quantity has become small, the pump can more efficiently suck the fuel where the fuel tank 28 is equipped with the pump unit 97 as in this embodiment.

Also, as the radiator 29 is arranged behind the fuel tank 28 and the battery 147 is arranged between the radiator 29 and the fuel tank 28, it is possible to set a relatively large space behind the fuel tank 28 by making the fuel tank 28 tall. The battery 147, which is a heavy item, can be arranged at the center of the body in the back-and-forth direction to contribute to enhancing the steerability. At the same time, by arranging the battery 147 between the heat-emitting radiator 29 and the fuel tank 28, heat from the radiator 29 can be prevented from affecting the fuel tank 28.

As the pump unit 97, accommodated and arranged in the lower part of the fuel tank 28, is fitted from the rear side of the fuel tank 28 to that fuel tank 28, the pump unit 97 can be fitted to the fuel tank 28 so as not to be affected by any level difference in the ground surface.

In addition, as the pump unit 97 is fitted in a posture wherein its rotation axis is inclined forward, to the fuel tank 28, the intake port of the pump unit 97 can be brought extremely close to the bottom of the fuel tank 28 thereby to minimize the dead residual of fuel within the fuel tank 28.

Further, regarding the water inlet 107 for use in the reservoir tank 104 of the radiator 29, the water inlet 107 for the reservoir tank 104 is disposed underneath the first maintenance lid 117 which is detachably fitted to the bottom wall of the storage box 30 arranged underneath the seating 31. Therefore, the arrangement of the radiator 29 behind the fuel tank 28 makes it easier to have the water inlet 107 of the radiator tank 104 overlook the bottom part of the seating 31, enabling the water inlet 107 to be arranged higher than where the step floor 159 immediately above the reservoir tank 104 overlooks the water inlet, resulting in improved water feeding ease.

Moreover, since the water inlet forming member 108 constituting the water inlet 107 is supported by the fitting portion 54 toward the body frame F side for the tension rod 53, disposed between the body frame F and the unit swing engine UE oscillatably supported by the body frame F, there is no particular contrivance needed for supporting the water inlet forming member 108. Thus, the water inlet forming member 108 can be supported by the body frame F.

Further, whereas fuel from the fuel tank 28 is to be fed to the fuel injection valve 74, the use of the pump unit 97 to which pressure is applied with the fuel tank 28 in which the level of the remaining fuel is made relatively high when the remaining volume of fuel is small enables the fuel in the fuel tank 28 to be effectively fed to the fuel injection valve 74.

The electric motor 42 for varying the gear ratio of the continuously variable transmission M intervening between the engine E and the rear wheel WR is arranged underneath the passenger steps 162 disposed before the step floor 159 of the body cover 34. The arrangement of the electric motor 42 in the relatively low position can contribute to lowering the center of gravity of the motorcycle.

Further, the continuously variable transmission M is a belt-type unit constituting the unit swing engine UE together with the engine E whose axis of the cylinder 45 is substantially horizontal. As the electric motor 42 is arranged ahead of the continuously variable transmission M and alongside the cylinder 45, the electric motor 42 can be protected by the cylinder 45 of the engine E and the continuously variable transmission M. Moreover, as the body frame F is provided with the support frames 41 for supporting the step floor 159 from underneath, and the electric motor 42 is arranged in a lower position than the support frames 41. Thus, the electric motor 42 can be protected more effectively by the highly rigid support frames 41.

The grab rail 118 is fitted to the rear part of the body frame F. The back rest 135, formed in a substantially streamlined shape having on its top the forward inclining face 135a falling forward as viewed sideways and the rearward inclining face 135b falling rearwardly and fitted to the rear top face of the grab rail 118, is arranged behind the pillion 33 of the seating 31.

Therefore, the forward inclining face 135a falling forward, out of the top face of the back rest 135, can securely hold the passenger on the pillion 33. In addition, the back rest 135 is substantially streamlined as viewed sideways. Thus, its appearance can be improved and its aerodynamic performance enhanced. In addition, since the rearward inclining face 135b falling rearwardly out of the top face of the back rest 135 can be utilized, any part of the luggage projecting beyond the rear end of the pillion 33 can be mounted on the back rest 135.

Also, since the back rest 135 is formed so as to decrease in width rearwardly as viewed from above, it is possible to form the back rest 135 compactly, secure the coordination of designs together with the shape of the body cover 34 and at the same time to enhance the aerodynamic performance.

Further, as the rear top face of the grab rail 118 is substantially equalized in height to the top face of the pillion 33 and the back rest 135 is detachably fitted to the rear top face of the grab rail 118, if many luggage is to be mounted on the pillion 33, the rear top face of the grab rail 118 after taking off the back rest 135 can be effectively utilized to mount the luggage.

The fuel refill lid 169 for closing the fuel tank 28, which is arranged in the floor tunnel part 167 of the body cover 34, is covered and is locked to be openably fitted to the floor tunnel part 167 of the body cover 34 in a position matching the fuel tank 28. The decorative cover 195 arranged in a position away from the fuel refill lid 169 is openably arranged on the inner cover 157 of the body cover 34. Thus, the unlocking member 272 for releasing the fuel refill lid 169 from the locked state is arranged on the inner cover 157 so as to be covered by the decorative cover 195 in the closed state. Therefore, as long as the decorative cover 195 is in the closed state, the unlocking member 272 will never be exposed. Accordingly, the risk for the unlocking member 272 to be undesirably tampered with can be minimized. In addition, the unlocking member is not influenced by external disturbances such as unfavorable weather. Thus, the effect on the unlocking member can also be minimized.

Further, as the inner cover 157 constitutes part of the body cover 34 by covering the head pipe 27 from behind and the decorative cover 195 and the unlocking member 272 are arranged on this inner cover 157, the manipulation of the unlocking member 272 can be facilitated by arranging the unlocking member 272 in a forward position closer to the rider.

Also, since the decorative cover 195 is an item for covering from the rear part of the body the storage compartment 193 installed in the inner cover 157 but no dedicated member for covering the unlocking member 272, it is made possible to dispense with a dedicated member to cover the unlocking member 272 and thereby reduce the number of parts. For instance, if a purse is kept in the storage compartment 193, it will be easier, when a fuel refill is to be received at a service station, to pay the price and therefore convenient, because the storage compartment 193 will be opened every time the fuel refill lid 169 is opened.

In addition, the storage compartment 193 is disposed in the inner cover 157 to be slidable in the back-and-forth direction of the body between the fully closed position in which it is stored in the inner cover 157 and the fully open position in which it projects from the inner cover 157 and offsets from the storage compartment 193 when viewed from the rear in the back-and-forth direction of the body. The unlocking member 272 is arranged on the inner cover 157 in a position where at least part of it overlaps the head pipe 27. The decorative cover 195 is fitted to the storage compartment 193 so as to cover the unlocking member 272 in a state in which the storage compartment 193 is in the fully closed position. Accordingly, by making it drawable, the unlocking member 272 can be arranged with a high space efficiency while securing a sufficient capacity for the storage compartment 193.

Further, as the left front storage section 191 is provided with the compartment locking mechanism 208 which locks the storage compartment 193 in its fully closed position and the opening of the fuel refill lid 169 requires undoing of the locked state of the storage compartment 193 in its fully closed position, no dedicated locking mechanism for opening the fuel refill lid 169 is required. Thus, enabling the lock structure to be simplified.

In addition, as the left and right front storage sections 191 and 192 are disposed on the inner cover 157 in the widthwise direction of the body with a space between them and the unlocking member 272 is arranged between the left and right front storage sections 191 and 192, the unlocking member 272 can be arranged with a high space efficiency by arranging the unlocking member 272 in the space created between the left and right front storage sections 191 and 192.

Further, as the unlocking member 272 is arranged in a position offset to the left, for instance, from the body center line C, the unlocking member 272 can be arranged in a position close to the left hand of rider mounting the seating 31 to facilitate his/her operation. Moreover, since the unlocking member 272 is arranged as described above in relation to the fuel refill lid 169 covering the fuel refill cap 168, which is frequently used, greater effectiveness can be achieved.

In addition, in the left front storage section 191, when an operation is preformed to open the storage compartment 193 from its fully closed position the holding mechanism 230 for temporarily holding the storage compartment 193 in an intermediate position between the fully closed position and the fully open position is disposed between the storage compartment 193 and the inner cover 157. Therefore it is possible to temporarily hold the storage compartment 193 in the intermediate position between the fully closed position and the fully open position, making it possible to use the storage compartment by matching it with many different conditions of use.

Further, as the holding mechanism 230 is configured to be able to temporarily hold the storage compartment 193 in substantially the central position between the fully closed position and the fully open position, goods of a proper size can be placed into or taken out of the storage compartment 193 while holding the storage compartment 193 in an appropriately opened state.

Still further, as the storage compartment 193 is fitted the inner cover 157 to be able to slide in the back-and-forth direction of the body between the fully closed position of being accommodated in the inner cover 157 and the fully open position in which it projects from the inner cover 157, and the hold releasing member 237 for undoing the holding state of the holding mechanism 230 is arranged on the under face of the storage compartment 193 in a position closer to the body center line C and the rear part of the body, the hold releasing member 237 can be arranged in a position where it can be easily manipulated when the storage compartment 193 is to be released from the state of being temporarily held by the holding mechanism 230.

There is further provided the compartment locking mechanism 208 which locks the storage compartment 193 in the fully closed position in response to the sliding of the storage compartment 193 in the closing direction to the fully closed position between the supporting frame 214 fixed to the inner cover 157 and the storage compartment 193, and to undo the locked state in response to the action of the unlocking force. As the storage compartment 193 in the fully closed position is given a spring pressure in the opening direction by the coil spring 212 and the spring pressure means 272, when the compartment locking mechanism 208 is caused to operate for unlocking by applying an unlocking force, the storage compartment 193 is caused to slide in the opening direction from the fully closed position by the spring pressure of the coil spring 212 and the spring pressure means 272, part of the storage compartment 193 projecting from the inner cover 157. Thus, the rider can easily perceive the unlocked state of the compartment locking mechanism 208. Further, less operational power to draw out the storage compartment 193 is required.

Also, the first and second unlocking buttons 248a and 249a for undoing the respective locked states of the left front storage section 191 and the storage box 30 are arranged relative to the inner cover 157 along a side of the left front storage section 191 with the plurality of unlocking buttons 248a and 249a are concentratively arranged along the side of the left front storage section 191. Therefore, the operation to unlock the left front storage section 191 and the storage box 30 is facilitate.

Further, as the first and second unlocking buttons 248a and 249a are arranged in positions offset rightwardly from the body center line C, the unlocking operation by the rider mounting the seating 31 is made easier.

In addition, since the first and second unlocking buttons 248a and 249a are measured greater in width and are arranged one over the other, the plurality of unlocking buttons 248a and 249a can be compactly arranged without allowing the first and second unlocking buttons 248a and 249a to occupy a large space in the longitudinal direction.

Further, as the first unlocking button 248a for releasing the left front storage section 191 from the locked state, the compartment locking mechanism 208 which the left front storage section 191 is equipped with and the first electric actuator 221 for bring an unlocking force to work on the compartment locking mechanism 208 are arranged at substantially the same heights. Thus, wiring between the unlocking button 248a for releasing the left front storage section 191 from the locked state and the first electric actuator 221 and the power transmission line between the first electric actuator 221 and the compartment locking mechanism 208 can be compactly configured.

While the embodiment of the present invention has been described so far, the invention is not limited to the above-described embodiment, but various design modifications are possible deviating from the invention as stated in the scope of claims.

For instance the embodiment above consisted of a case in which the invention is applied in connection with the fuel refill lid 169. It is also possible to apply the present invention in connection with the lid for covering the storage box 30 underneath the seating 31, or the invention can as well be applied to a lid for use in maintenance work on the internal structure of the body. Further the unlocking member 272 is not limited to operation members for mechanically releasing a lid from a locked closed state, but can as well be intended for an electric actuator to undo a locked state, or a key hole for releasing the lid locking mechanism is also conceivable. The invention is applicable to a variety of vehicles including motorcycles, three-wheeled vehicles and buggies.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An unlocking member arranging structure for vehicles comprising:
a vehicle wherein a fuel tank is arranged in a body cover and is supported by a body frame;
a lid adapted to be locked in a closed state, said lid covering said fuel tank and being openably fitted to said body cover in a position matching said fuel tank for permitting access thereto;
a cover member arranged in a position away from said lid, said cover being openably fitted to said body cover; and
an unlocking member for releasing said lid from a locked state is arranged on said body cover so as to be covered by said cover member in a closed state.

2. The unlocking member arranging structure for vehicles according to claim 1, wherein said cover member and said unlocking member are arranged onto an inner cover which covers from behind a head pipe provided on the body frame at its front end and constitutes part of said body cover.

3. The unlocking member arranging structure for vehicles according to claim 2, wherein a storage compartment in said inner cover is covered by said cover member from the rear part of the body.

4. The unlocking member arranging structure for vehicles according to claim 3, wherein said storage compartment is disposed in said inner cover to be slidable in the back-and-forth direction of the body between a fully closed position of being accommodated in said inner cover and a fully open position of projecting from said inner cover and is offset from said storage compartment as viewed from behind in the back-and-forth direction of the body, said unlocking member is disposed on said inner cover in a position of at least partly overlapping said head pipe, and said cover member is fitted to the storage compartment so as to cover said unlocking member in a state in which said storage compartment is in the fully closed position.

5. The unlocking member arranging structure for vehicles according to claim 4, and further including a compartment locking mechanism to lock said storage compartment in its fully closed position.

6. The unlocking member arranging structure for vehicles according to claim 2, wherein left and right front storage sections are disposed in said inner cover along the direction of the body width with a space between them, and said unlocking member is arranged between the left and right front storage sections.

7. The unlocking member arranging structure for vehicles according to claim 6, wherein said unlocking member is arranged in a position offset from the body center line toward one side in the right-and-left direction.

8. The unlocking member arranging structure for vehicles according to claim 1, wherein said fuel tank is arranged in the vicinity of step floors which said body cover is provided with and said lid is fitted to said body cover so as to cover the fuel refill cap of the fuel tank.

9. The unlocking member arranging structure for vehicles according to claim 1, wherein a lock is operatively connected to said lid, said lock includes a rod extending along the body and a spring for applying pressure to the rod for actuating said lock.

10. The unlocking member arranging structure for vehicles according to claim 9, wherein by actuating said unlocking member said rod is moved for unlocking said lid to permit access to said fuel tank.

11. An unlocking arrangement comprising:
a fuel tank arranged in a cover is supported by a frame;
a lid adapted to be locked in a closed state covering said fuel tank, said lid being openably fitted to said cover in a position matching said fuel tank for permitting access thereto;
a cover member arranged in a position away from said lid, said cover member being openably fitted to said cover; and
an unlocking member for releasing said lid from a locked state, said unlocking member being arranged on said cover for being covered by said cover member in a closed state.

12. The unlocking arrangement according to claim 11, wherein said cover member and said unlocking member are arranged onto an inner cover which covers from behind a frame at its front end and constitutes part of said cover.

13. The unlocking arrangement according to claim 12, wherein a storage compartment in said inner cover is covered by said cover member from the rear.

14. The unlocking arrangement according to claim 13, wherein said storage compartment is disposed in said inner cover to be slidable in the back-and-forth direction between a fully closed position of being accommodated in said inner cover and a fully open position of projecting from said inner cover and is offset from said storage compartment as viewed from behind, said unlocking member is disposed on said inner cover in a position of at least partly overlapping said frame, and said cover member is fitted to the storage compartment so as to cover said unlocking member in a state in which said storage compartment is in the fully closed position.

15. The unlocking arrangement according to claim 14, and further including a compartment locking mechanism to lock said storage compartment in its fully closed position.

16. The unlocking arrangement according to claim 12, wherein left and right front storage sections are disposed in said inner cover along the direction of the body width with a space between them, and said unlocking member is arranged between the left and right front storage sections.

17. The unlocking arrangement according to claim 16, wherein said unlocking member is arranged in a position offset from the center line toward one side in the right-and-left direction.

18. The unlocking arrangement according to claim 11, wherein said fuel tank is arranged in the vicinity of step floors which said cover is provided with and said lid is fitted to said cover so as to cover the fuel refill cap of the fuel tank.

19. The unlocking arrangement according to claim 11, wherein a lock is operatively connected to said lid, said lock includes a rod and a spring for applying pressure to the rod for actuating said lock.

20. The unlocking arrangement according to claim 19, wherein by actuating said unlocking member said rod is moved for unlocking said lid to permit access to said fuel tank.

* * * * *